United States Patent
Rutkowski

(10) Patent No.: US 12,224,655 B2
(45) Date of Patent: Feb. 11, 2025

(54) MULTI-INPUT VOLTAGE REGULATION

(71) Applicant: Qualcomm Incorporated, San Diego, CA (US)

(72) Inventor: Joseph Dale Rutkowski, Chandler, AZ (US)

(73) Assignee: QUALCOMM Incorporated, San Diego, CA (US)

( * ) Notice: Subject to any disclaimer, the term of this patent is extended or adjusted under 35 U.S.C. 154(b) by 626 days.

(21) Appl. No.: 17/462,243

(22) Filed: Aug. 31, 2021

(65) Prior Publication Data
US 2023/0066436 A1 Mar. 2, 2023

(51) Int. Cl.
| | | |
|---|---|---|
| H02M 3/07 | (2006.01) | |
| H02J 7/00 | (2006.01) | |
| H02M 1/00 | (2006.01) | |
| H02M 3/158 | (2006.01) | |

(52) U.S. Cl.
CPC ......... *H02M 1/0009* (2021.05); *H02J 7/0013* (2013.01); *H02M 1/0095* (2021.05); *H02J 2207/20* (2020.01); *H02M 3/07* (2013.01); *H02M 3/1582* (2013.01)

(58) Field of Classification Search
CPC .... H02M 1/0095; H02M 3/07; H02M 3/1582; H02M 1/0009; H02J 2207/20; H02J 7/0013
See application file for complete search history.

(56) References Cited

U.S. PATENT DOCUMENTS

| | | | |
|---|---|---|---|
| 8,854,019 B1 * | 10/2014 | Levesque | H02M 1/14 363/60 |
| 9,793,804 B2 | 10/2017 | Zhang et al. | |
| 10,317,968 B2 | 6/2019 | Pant et al. | |

(Continued)

FOREIGN PATENT DOCUMENTS

| | | |
|---|---|---|
| EP | 3588721 A1 | 1/2020 |
| EP | 3202025 B1 | 5/2020 |

(Continued)

OTHER PUBLICATIONS

Lu, et al., "Session 11 Overview: DC-DC Converters", 2020 IEEE International Solid-State Circuits Conference, 2020, 26 pages.

(Continued)

*Primary Examiner* — Harry R Behm
(74) *Attorney, Agent, or Firm* — Colby Nipper

(57) ABSTRACT

An apparatus is disclosed for voltage regulation. In example implementations, an apparatus includes a battery subsystem having a first terminal, a second terminal, a third terminal, and at least one battery. The apparatus also includes a voltage regulator that is coupled to the first terminal, the second terminal, and the third terminal. The voltage regulator includes multiple switches, an energy storage unit, and control circuitry. The multiple switches include a first switch coupled to the first terminal, a second switch coupled to the second terminal, and a third switch coupled to the third terminal. The energy storage unit is coupled to the multiple switches. The control circuitry is coupled to the multiple switches and is configured to selectively couple the energy storage unit to the first terminal via the first switch, the second terminal via the second switch, or the third terminal via the third switch.

16 Claims, 22 Drawing Sheets

(56) References Cited

U.S. PATENT DOCUMENTS

| | | | |
|---|---|---|---|
| 11,579,646 B2* | 2/2023 | Khlat | G05F 1/575 |
| 2014/0070787 A1* | 3/2014 | Arno | H02M 3/02 |
| | | | 323/304 |
| 2016/0064986 A1 | 3/2016 | Langlinais et al. | |
| 2017/0279359 A1* | 9/2017 | Goncalves | H02M 3/1584 |
| 2017/0302093 A1* | 10/2017 | Petersen | H02M 7/4837 |
| 2020/0395762 A1 | 12/2020 | Blakemore et al. | |
| 2021/0067041 A1 | 3/2021 | Cho et al. | |
| 2022/0302826 A1* | 9/2022 | Matei | H02M 3/158 |

FOREIGN PATENT DOCUMENTS

| | | | |
|---|---|---|---|
| FR | 3003827 A1 | 10/2014 | |
| WO | 2015077180 A1 | 5/2015 | |
| WO | 2018182855 A1 | 10/2018 | |

OTHER PUBLICATIONS

Wei, et al., "Design of an Average-Current-Mode Noninverting Buck-Boost DC-DC Converter With Reduced Switching and Conduction Losses", IEEE Transactions on Power Electronics, vol. 27, No. 12, Dec. 2012, Dec. 2012, 10 pages.

Partial International Search Report—PCT/US2022/074219—ISA/EPO—Nov. 10, 2022, 18 pages.

International Search Report and Written Opinion—PCT/US2022/074219—ISA/EPO—Feb. 7, 2023, 25 pages.

* cited by examiner

MULTI-INPUT VOLTAGE REGULATION

TECHNICAL FIELD

This disclosure relates generally to powering electronic devices and, more specifically, to regulating a voltage.

BACKGROUND

Electronic devices include traditional computing devices such as notebook computers, tablet computers, smartphones, wearable devices like a smartwatch or fitness tracker, and so forth. Electronic devices also include other types of computing devices such as personal voice assistants, thermostats and other automated controllers, security devices and other sensors, Internet of Things (IoT) devices, power tools, drones and robotic machines, electric and hybrid vehicles, and so forth. These various electronic devices provide services relating to productivity, communication, social interaction, security, safety, remote management, entertainment, transportation, and information dissemination. Thus, electronic devices, including portable electronic devices, play crucial roles in many aspects of modern society.

Some of the services provided by portable electronic devices in today's interconnected and mobile world depend at least partly on the "portable" aspect of portable electronic devices. To provide power to portable electronic devices, batteries may be employed. Batteries are reliable and portable energy sources that are used by a wide range of electronic devices, such as mobile phones, laptops, toys, power tools, medical device implants, electrically powered vehicles, and satellites. Further, some batteries are rechargeable via an external power source and can therefore be reused multiple times through recharging.

During use, an electronic device can receive power from the battery. The battery generates a voltage, and the voltage is provided to a load of the electronic device. Examples of loads include processors, memories, wireless interfaces like a transceiver or cellular modem, and display screens. Such loads may operate more reliably or with a higher quality if provided a relatively constant voltage. Batteries, however, may provide a voltage that fluctuates over time. Such a fluctuating voltage can adversely impact the performance of the load.

To provide a steadier, more constant voltage level to the load, an electronic device can employ a voltage regulator. The voltage regulator can be positioned between the battery and the load. In operation, the voltage regulator accepts a voltage from the battery that may be varying over time. The voltage regulator converts the varying voltage to a steadier voltage level and provides the steadier, more constant voltage to the load. The load can therefore operate more reliably or with a higher performance level.

It is challenging, however, for a voltage regulator to output a constant voltage to a load based on a changing input voltage under different operating conditions. Electrical engineers and other designers of electronic devices therefore strive to improve voltage regulation performance.

SUMMARY

In example implementations, voltage regulation entails deploying a voltage regulator between a load and two voltage rails being held at two supply voltages. A battery subsystem provides the two supply voltages. To do so, the battery subsystem includes at least one battery and may include voltage adjustment circuitry. As described herein, the at least one battery can be realized with a single cell battery or a multi-cell battery (e.g., at least two cells). Two battery cells with a center tap, two battery cells with a capacitive divider, or one battery cell with a charge pump may generate two supply voltages for the battery subsystem.

In operation, an example voltage regulator can generate a stable voltage using the two supply voltages: a first supply voltage and a second supply voltage. For example, the voltage regulator can buck between the first supply voltage and ground or between the second supply voltage and the first supply voltage to reduce a variance of a voltage being applied to an energy storage unit of the voltage regulator. In some cases, the voltage regulator can also be used in a boost mode to increase the range of usable supply voltages—e.g., as a battery's stored energy is depleted. In some implementations, the voltage regulation is controlled using two to four voltage ramping signals. A controller of the voltage regulator can switch regulation modes based, for instance, on the ramping signals and a sensed current corresponding to the energy storage unit. In these manners, the voltage regulation can provide a more stable output voltage and/or can operate at higher bandwidths to respond more quickly to changes in the supply voltages.

In an example aspect, an apparatus for voltage regulation, such as multi-input voltage regulation, is disclosed. The apparatus includes a battery subsystem. The battery subsystem includes a first terminal, a second terminal, a third terminal, and at least one battery. The apparatus also includes a voltage regulator. The voltage regulator is coupled to the first terminal, the second terminal, and the third terminal of the battery subsystem. The voltage regulator includes multiple switches, an energy storage unit, and control circuitry. The multiple switches include a first switch coupled to the first terminal, a second switch coupled to the second terminal, and a third switch coupled to the third terminal. The energy storage unit is coupled to the multiple switches, and the control circuitry is coupled to the multiple switches. The control circuitry is configured to selectively couple the energy storage unit to the first terminal via the first switch, the second terminal via the second switch, or the third terminal via the third switch.

In an example aspect, an apparatus for voltage regulation, such as multi-input voltage regulation, is disclosed. The apparatus includes power means for providing a first supply voltage and a second supply voltage. The apparatus also includes energy means for storing energy from the power means. The apparatus additionally includes switching means for selectively coupling the power means to the energy means. The apparatus further includes control means for operating the switching means to selectively couple the first supply voltage and the second supply voltage to the energy means based on a current corresponding to the energy means.

In an example aspect, a method for voltage regulation, such as multi-input voltage regulation, is disclosed. The method includes sensing a current flowing through at least one inductor. The method also includes generating two or more ramp signals. The method additionally includes comparing a signal that is based on the current to the two or more ramp signals. The method further includes selectively coupling a first voltage rail or a second voltage rail to the at least one inductor based on the comparing.

In an example aspect, an apparatus for voltage regulation, such as multi-input voltage regulation, is disclosed. The apparatus includes a battery subsystem configured to hold a first voltage rail to a first supply voltage and a second voltage rail to a second supply voltage. The apparatus also includes a voltage regulator. The voltage regulator includes a first switch, a second switch, an energy storage unit, and control circuitry. The first switch is coupled to the first voltage rail, and the second switch is coupled to the second voltage rail. The energy storage unit is coupled between an output of the voltage regulator and the first switch and the second switch. The control circuitry is coupled to the energy storage unit and is configured to operate the voltage regulator in multiple modes based on a signal corresponding to the energy storage unit. The multiple modes include a first bucking mode, a second bucking mode, and a third bucking mode. The first bucking mode bucks between the first supply voltage and a ground using the first switch. The second bucking mode bucks between the second supply voltage and the first supply voltage using the second switch and the first switch. The boosting mode couples the second supply voltage to the energy storage unit using the second switch.

BRIEF DESCRIPTION OF DRAWINGS

FIG. 3-1 is a schematic diagram of a power system illustrating an example battery subsystem with one battery cell and voltage adjustment circuitry.

FIG. 3-2 is a schematic diagram of a power system illustrating an example battery subsystem with two battery cells and voltage adjustment circuitry.

FIG. 3-3 is a schematic diagram of a power system illustrating an example battery subsystem with two battery cells and a center tap.

FIGS. 4-1 and 4-2 are schematic diagrams illustrating example battery subsystems with a single-cell battery and a charge pump, with the battery subsystem coupled to a buck converter or a buck-boost converter, respectively.

FIGS. 4-3 and 4-4 are schematic diagrams illustrating example battery subsystems with a stacked-cell battery and a capacitive divider, with the battery subsystem coupled to a buck converter or a buck-boost converter, respectively.

FIG. 5-1 is a circuit diagram illustrating an example buck converter for a voltage regulator that is coupled to a load.

FIG. 5-2 is a circuit diagram illustrating an example buck-boost converter for a voltage regulator that is coupled to a load.

FIGS. 6-1 to 6-3 illustrate example bucking modes with various charging and discharging operations.

FIG. 6-4 illustrates an example boosting mode with charging and discharging operations.

FIG. 7-1 illustrates multiple ramping signals and multiple switching control signals for an example bucking control mode.

FIG. 7-2 illustrates multiple ramping signals and multiple switching control signals for an example boosting control mode.

FIG. 7-3 illustrates multiple ramping signals and multiple switching control signals for an example combination of bucking and boosting control modes.

FIG. 7-4 illustrates multiple ramping signals that can facilitate a seamless transition between leading with different voltage rails while bucking between two voltage rails.

FIG. 8-1 is a schematic diagram illustrating additional example aspects for the controller of FIG. 8.

FIG. 8-2 is a schematic diagram illustrating other example aspects for the controller of FIG. 8.

DETAILED DESCRIPTION

Figure 1:
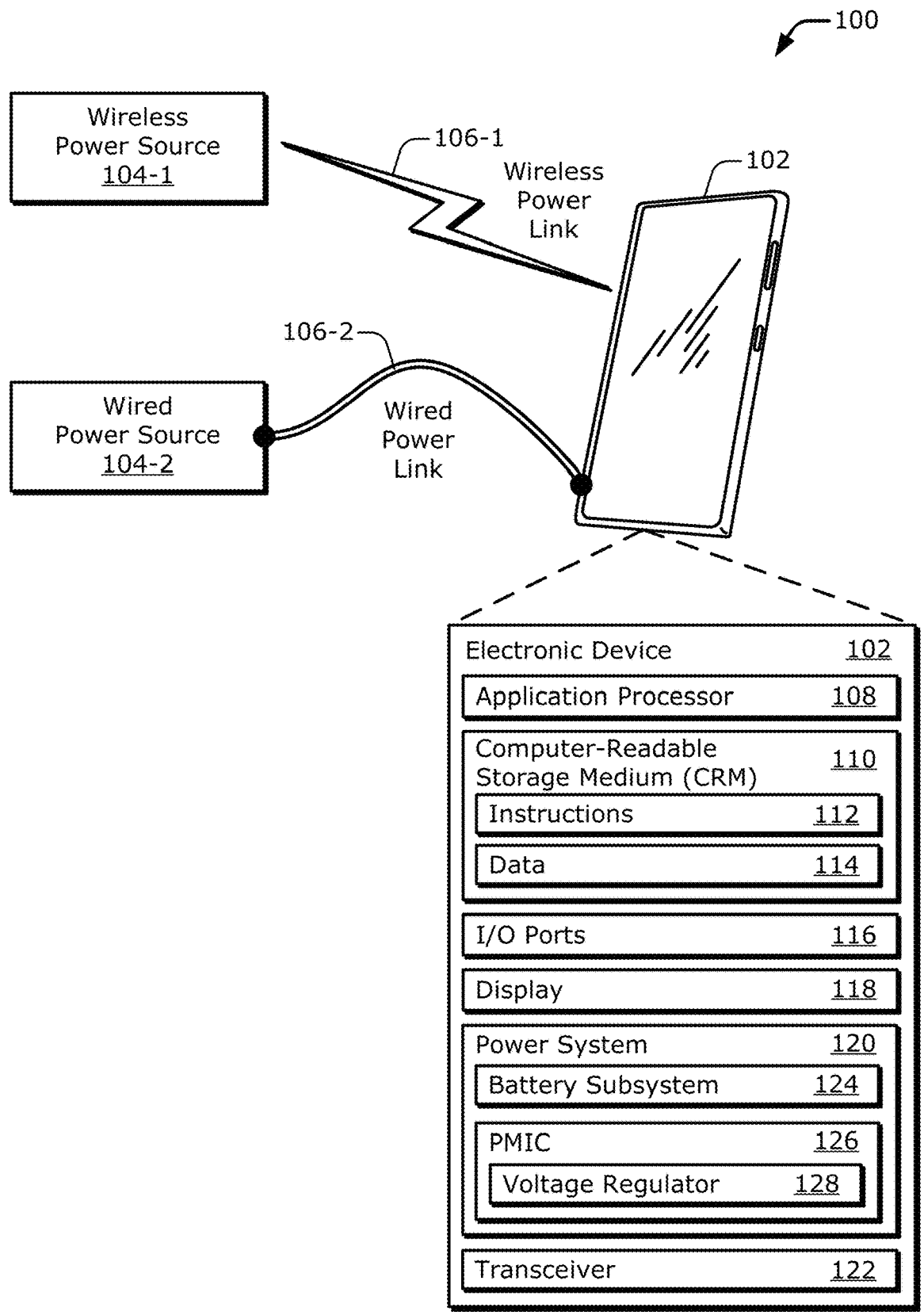
FIG. 1 illustrates an environment depicting an example electronic device having a power system including a battery subsystem and a voltage regulator.

Portable electronic devices, and some other electronic devices, can obtain power from a battery while the device is mobile or while a grid or other "main" or fixed power source is unavailable. The battery may include a single-battery cell or multiple battery cells. Multi-cell batteries, which have two or more cells that are coupled together in series, can also be referred to as stacked cell batteries. Stacked cell batteries may produce a relatively higher voltage as compared to single-cell batteries. Due in part to the higher voltages, stacked cell batteries are becoming more common in higher-end devices, like premium model smart phones. Manufacturers, however, continue to use a lower-cost single-cell battery design in many devices. Creating separate circuits and components for power systems to accommodate both types of battery designs is expensive. For example, creating separate battery subsystems and voltage regulators for single-cell and multi-cell battery designs is more expensive than using a unified architecture. Example implementations for unified architectures are described below. Further, these unified architectures can provide low-ripple output voltages with a high bandwidth (BW).

One approach to a power system for an electronic device includes a boost converter to implement a voltage regulator between a battery and a load. Examples of loads include memories, transceivers, processors, and display screens. Each of these loads draws current from a boost converter that is attempting to provide a stable output voltage. A boost convertor, however, has frequency response limitations in part because it provides a discontinuous output current to the load. The boost converter also spends additional time charging an inductor thereof, which means the time available to deliver current to the output is reduced. From a control system analysis perspective, this behavior causes a right-hand plane zero (RHPZ). The RHPZ constrains the control loop of the voltage regulator to have a lower bandwidth (e.g., BW<RHPZ/3) than is acceptable in applications that demand fast responsiveness for a stable output voltage.

Moreover, the value of the RHPZ decreases with increasing load current. Some portable electronic devices, as well as certain other electronic devices, include components with high current demands. Such components with high current demands include multicore processors, graphics processors, transceivers with an active power amplifier, and modern display screens (e.g., light-emitting diode (LED) screens). An active-matrix organic LED (AMOLED) display device, for instance, can draw 100s of milliamps (mA). At the same time, AMOLED panels are sensitive to transients on power supply rails. Specifically, a voltage regulator serving an AMOLED display is tasked with having a high bandwidth to prevent line and load transients from causing on-the-screen artifacts that are visual to a user. It is therefore challenging to meet the competing demands of high load current and high bandwidth using a boost converter as a voltage regulator.

For lower-current loads, some approaches may employ a boost converter. As described above, as the load current increases, the bandwidth of the boost converter decreases, which adversely affects the speed at which the boost converter can counteract changes in the input voltage, including line transients on a power supply rail coupled to a battery. Further, if the supply voltage exceeds a specified load voltage, the boost converter may be unable to provide the specified load voltage as the output voltage of the boost converter. For a typical synchronous boost converter to operate correctly, the input voltage must be lower than the output voltage. As a battery charge termination voltage increases, the input voltage to the boost converter likewise increases. To accommodate such situations, a system designer may be able to turn to asynchronous rectification or a buck-boost architecture. In some approaches that involve boosting, a designer may set synchronous boosting to occur about 95% of the time, but this results in line transients being difficult to reject in an asynchronous mode.

In contrast, to address the various concerns described above, example implementations provide a power system including a battery subsystem and a voltage regulator. The battery subsystem includes at least one battery and can include voltage adjustment circuitry. The voltage regulator includes an energy storage unit, like an inductor, multiple switches, and control circuitry. In operation, the battery subsystem produces multiple supply voltages, such as a first supply voltage and a second supply voltage. The control circuitry can selectively couple the energy storage unit to the first supply voltage, the second supply voltage, or a ground as part of a bucking operation. The voltage regulator can realize, for instance, a dual-input, three-level buck converter.

Regarding battery flexibility, the battery subsystem can provide the voltage regulator with at least two supply voltages, whether the battery subsystem has a single-cell battery or a multi-cell battery. For example, if the battery subsystem has a single-cell battery, the voltage adjustment circuitry can operate as a charge pump that increases (e.g., doubles) a voltage of the single-cell battery. Accordingly, the battery subsystem can provide two supply voltages, with one approximately double the other. Alternatively, if the battery subsystem has a dual-cell battery, the voltage adjustment circuitry can operate as a capacitive divider that reduces (e.g., halves) a voltage of the dual-cell battery. Accordingly, the battery subsystem can provide two supply voltages, with one approximately half the other. Further, a battery subsystem may include two battery cells and a center tap. By coupling respective first and second voltage rails to the center tap and a cathode terminal of the battery, the battery subsystem can provide two supply voltages without voltage adjustment circuitry.

In the first two of the three cases described above, the voltage adjustment circuitry operates to provide a second voltage from a first voltage of the battery. One voltage is substantially equivalent to a voltage provided by a single-cell battery, and the other voltage is substantially equivalent to a voltage provided by a dual-cell battery. In the third of the three cases described above, a dual-cell battery can provide the first and second voltages without using voltage adjustment circuitry. Thus, this document describes a unified architecture that provides voltage regulation with a battery subsystem having a single-cell battery or a dual-cell battery, with or without voltage adjustment circuitry. Design and manufacturing expenses can therefore be reduced by using the unified architecture. Although these examples are described in terms of one or two battery cells, the principles are applicable to a different quantity of battery cells, such as three or four battery cells.

With respect to the lower bandwidth of a boost converter, example approaches are described that employ a buck converter, which can avoid the bandwidth-reducing RHPZ issue. A voltage regulator can be realized using a buck converter. The buck converter can be coupled to the two or more supply voltages—e.g., a higher supply voltage and a lower supply voltage—to provide additional bucking flexibility across multiple voltage regulation modes. For example, the buck converter can buck between the lower supply voltage (e.g., "SV1") and ground if the lower supply voltage is greater than the output voltage targeted for the load. In another regulation mode, if the lower supply voltage is about the same as the targeted load voltage, the lower supply voltage can be passed through as the output voltage with little to no bucking. In yet another voltage regulation mode, if the lower supply voltage falls below the targeted load voltage, then the buck converter can buck between the lower supply voltage and the higher supply voltage (e.g., "SV2"). In such a voltage regulation mode, energy is stored in, e.g., an inductor of a converter while the higher supply voltage (SV2) is applied to a converter switching node during a first phase of the mode. In the first phase, the current in the inductor can increase at a rate of (SV2−Vout)/L, with "Vout" representing the output voltage of the converter and "L" representing an inductance of the inductor. In a second phase of this mode, energy is transferred from the inductor to the output of the converter while the lower supply voltage (SV1) is applied to the converter switching node. In the second phase, the current in the inductor can decrease at a rate of (SV1−Vout)/L.

By bucking between the higher and lower supply voltages, the voltage applied to the energy storage unit at a switching node is lower as compared to bucking between the higher supply voltage and the ground. This can reduce both the current ripple and the output voltage ripple. By reducing the inductor current ripple, losses in the inductor can likewise be reduced, which can improve efficiency with respect to the inductor. Further, the voltage swing on the switching node is reduced, which decreases switching losses and improves the converter efficiency. Each of these voltage regulation modes can also provide a continuous output current, including substantially during transitions between modes. This contrasts with a boost-only topology in which current flow is intermittent. Further, there is no bandwidth constraint arising from an RHPZ as there is with a pure boost converter. In some cases, the bandwidth of a voltage regulator that is based on a buck converter as described herein can provide a loop bandwidth that is four to eight times greater than that of a boost converter. For instance, some described buck-based voltage regulators can provide over 500 kilohertz (kHz) of bandwidth versus 60-120 kHz for various boost converters.

This document also describes power system approaches that can be extended to include boost converter techniques. For example, a voltage regulator may employ a dual-input three-level buck-boost converter. The boost converter functionality can be activated if, for instance, the high supply voltage also falls below the target load voltage. This is more likely to happen when a battery's total charge nears complete depletion, such as at 1-3% of the total charge. Nonetheless, the boost converter functionality can also be activated if, for instance, the target load voltage is raised above the high supply voltage or any other time that the target load voltage is greater than the high supply voltage for some reason. Accordingly, described voltage regulators can efficiently couple a battery subsystem to a load throughout a battery's charge cycle—from fully charged to near-complete depletion. The loop bandwidth can also be maintained sufficiently high to substantially suppress line transients while handling larger load currents, such as those drawn by an AMOLED display.

This document further describes voltage regulator control techniques. A controller can select a voltage regulation mode based on at least one signal associated with the output of the voltage regulator and two or more ramping signals. In buck converter implementations, opposing ramps can include a ground ramp and a higher supply voltage ramp. In buck-boost converter implementations, two additional ramps can include a lower supply voltage ramp and a boost ramp. Seamless transitions between voltage leads for a dual-input buck converter (including a dual-input buck-boost converter) can be achieved by employing overlapping lower and higher supply voltage ramps. In some implementations, the at least one signal associated with the voltage regulator output can include two signals: an output voltage and a current flowing through an energy storage unit of the converter. The controller changes converter modes based on one or more comparisons between an error signal and the multiple ramping signals. The error signal can be derived from the two signals associated with the voltage regulator output. In these manners, a converter with at least one bucking mode or a converter with bucking and boosting modes may be efficiently controlled using two or more ramping signals.

In some implementations, a voltage regulator can operate using multiple voltage inputs—e.g., as a multi-input converter. For example, a multi-input buck converter can achieve high bandwidth in a system having an output voltage that is lower than, e.g., the maximum voltage of a two-cell battery. The multi-input converter can also be realized as a buck-boost converter as the battery is depleted or if the targeted output voltage otherwise becomes greater than a voltage obtainable using the battery. In boost mode, a high bandwidth can still be achieved by operating the boost at a relatively short duty cycle.

In other implementations, multi-input converters can use average-current-mode control combined with multiple modulators, such as four modulators. The four modulators enable control between two or more levels of a buck converter. For example, the four modulators can modulate between a first voltage level and ground or between a second voltage level and the first voltage level, with the second voltage level being higher than the first voltage level. The modulators can also modulate between a voltage level, such as the second voltage level, and a boost mode of operation.

Described techniques can provide a smooth transition or handoff between two modes of modulation. For example, a smooth handoff can be achieved between leading with the first voltage level to leading with the second voltage level, and vice versa. In some cases, a voltage-based error signal, which is derived from a current of a voltage converter, is generated by a compensator of a current loop of a controller of the converter. The controller can smoothly transition between modes based on the error signal. A first example mode is a bucking operation between the first voltage level and ground. A second example mode is a bucking operation between the second voltage level and the first voltage level. A third example mode is a boosting operation using the second voltage level. Other modes, however, may additionally or alternatively be employed.

The controller can use the error signal to transition smoothly from the first mode to the second mode, in part by switching seamlessly between leading with the first voltage level to leading with the second voltage level at the start of each control cycle (e.g., based on a clock cycle). The controller can then selectively transition smoothly from the second mode to the third mode. While in the second mode, a control cycle can start with the second voltage level from a second voltage input charging an inductor of the voltage converter. The controller can switch to a first voltage input having the first voltage level to discharge the inductor during the control cycle in a bucking operation. Alternatively, the controller can transition from the second mode to a third mode (e.g., a boost mode) of operation using the second voltage level.

The control techniques can be implemented, for instance, by employing two pairs of modulators with dual ramps. Additionally or alternatively, the control techniques can be implemented using four sets of ramping signals with at least some voltage overlap between two pairs of opposing ramp signals. For example, a ramping signal of a first pair of signals for controlling the first mode of operation can at least partially overlap another ramping signal of a second pair of signals for controlling the second mode of operation. While the error signal is present within this voltage overlap of two opposing ramp signals, the controller can switch from initiating a control cycle using the first voltage input to initiating a control cycle using the second voltage input by establishing inverse or complementary duty cycle lengths, as is described below with reference to FIG. 7-3. The inverse duty cycle lengths can each produce a same output voltage for the voltage converter even though different voltage inputs are leading different control cycles.

This enables a voltage converter to utilize multiple modulation modes and smoothly transition between different modes of operation, such as between two different bucking modes or between a bucking mode and a boosting mode. These techniques can achieve a higher bandwidth than a traditional boosting voltage converter in part by avoiding a RHPZ. With the higher bandwidth, the voltage converter can provide superior voltage regulation.

FIG. 1 illustrates an example environment 100 depicting an electronic device 102 having a power system 120 including a battery subsystem 124 and a voltage regulator 128. In the environment 100, the example electronic device 102 can be charged via a power link 106 from a power source 104, as is described below. In FIG. 1, the electronic device 102 is depicted as a smartphone. However, the electronic device 102 may be implemented as any suitable computing or other electronic device, such as any electronic device that can be powered from a battery subsystem 124.

Electronic devices with a battery subsystem 124 are generally designed to be at least temporarily separated from a grid connection, or they can be intended to accommodate situations in which grid power is otherwise unavailable. Thus, the electronic device 102 can comprise a portable electronic device. Examples of electronic devices include a cellular base station, broadband router, access point, cellular or mobile phone, gaming device, navigation device, media device, laptop computer, desktop computer, tablet computer, server computer, network-attached storage (NAS) device, smart appliance, vehicle-based power or charging system, Internet of Things (IoT) device, sensor or security device, asset tracker, fitness management device, wearable device such as intelligent glasses or smart watch, wireless power device (transmitter or receiver), portable battery device (e.g., portable charger), medical device, battery-backup system or device containing a battery-backup system, battery storage system (e.g., a residential or industrial device to store power from a non-constant power source such as wind or solar), an electric or hybrid vehicle or drone, and so forth.

Examples of a power source 104 include a wireless power source 104-1 and a wired power source 104-2. However, a power source 104 can be realized in a different manner than those described herein. The electronic device 102 can receive power from the power source 104 via a power link 106, which may be implemented as any suitable type of link that can provide power. For instance, the electronic device 102 can be coupled to the wireless power source 104-1 (e.g., an apparatus with a transmitter coil) to receive power via a wireless power link 106-1 (e.g., an electromagnetic signal). Additionally or alternatively, the electronic device 102 can be coupled to a wired power source 104-2 (e.g., a socket connected to the grid, a photovoltaic array, or a transformer adapter) to receive power via a wired power link 106-2 (e.g., a cable, cord, or wire).

Either or both of these power links 106 can be configured in accordance with a proprietary protocol or a standardized protocol, such as a Wireless Power Consortium (Qi®) protocol for the wireless power link 106-1 or a Universal Serial Bus (USB®) standard or a QUICK CHARGE™ protocol for the wired power link 106-2. Each power link 106 may also provide an in-band or out-of-band communication channel in conjunction with a power conduit. Generally, the power link 106 extends from the power source 104 to the electronic device 102 to provide power to the power system 120 for charging at least one battery (not shown in FIG. 1) of the battery subsystem 124.

As shown, the electronic device 102 includes at least one application processor 108 and at least one computer-readable storage medium 110 (CRM 110). The application processor 108 may include any type of processor, such as a central processing unit (CPU) or a multicore processor, that is configured to execute processor-executable instructions (e.g., code) stored by the CRM 110. The CRM 110 may include any suitable type of data storage media, such as volatile memory (e.g., random-access memory (RAM)), non-volatile memory (e.g., Flash memory), optical media, magnetic media (e.g., disk or tape), and so forth. In the context of this disclosure, the CRM 110 is implemented to store instructions 112, data 114, and other information of the electronic device 102, and thus the CRM 110 does not include transitory propagating signals or carrier waves.

The electronic device 102 may also include one or more input/output ports 116 (I/O ports 116) or at least one display 118. The I/O ports 116 enable data exchanges or interaction with other devices, networks, or users. The I/O ports 116 may include serial ports (e.g., universal serial bus (USB) ports), parallel ports, audio ports, infrared (IR) ports, camera or other sensor ports, and so forth. The display 118 can be realized as a display screen or a projection that presents one or more graphical images provided by the electronic device 102, such as a user interface associated with an operating system, program, or application. Alternatively or additionally, the display 118 may be implemented as a display port or virtual interface through which graphical content of the electronic device 102 is communicated or presented.

Although not explicitly shown, the electronic device 102 can further include at least one wireless interface device and at least one antenna, which are coupled one to another. The wireless interface device provides connectivity to respective networks and peer devices via a wireless communication link, which may include the wireless power link 106-1. Alternatively or additionally, the electronic device 102 may include a wired interface device for communicating with another electronic device via a wired communication link, which may include the wired power link 106-2. A wireless interface device may include at least one communication processor (e.g., a modem or a signal processor), at least one transceiver 122, and at least one radio-frequency (RF) front-end that are operatively coupled together to provide wireless communications using the power system 120. As used herein, an operative coupling between two or more components can enable the operatively coupled components to communicate with each other, to share a voltage, to exchange a current, to perform a function, or to otherwise operate as described herein.

In example implementations, the electronic device 102 also includes the power system 120. The power system 120 can include a battery subsystem 124 and a power management integrated circuit 126 (PMIC 126). The PMIC 126 may include a voltage regulator 128. The voltage regulator 128 may, however, additionally or alternatively include at least one discrete circuit component. The battery subsystem 124 can be operatively coupled to the voltage regulator 128, as described herein. In operation, the battery subsystem 124 can generate one or more supply voltages. The voltage regulator 128 can regulate such supply voltages to provide a higher quality voltage to a load (e.g., provide a steadier voltage level with smaller or fewer fluctuations).

The various components illustrated in FIG. 1 (and other figures) using separate schematic blocks may be manufactured or packaged in different discrete manners. For example, one physical PCB may include or support components of the battery subsystem 124, and another physical PCB may include the PMIC 126 or the voltage regulator 128 thereof. Alternatively, one PCB may support a battery while another PCB supports other parts of the battery subsystem 124 and at least part of the voltage regulator 128. Further, the components illustrated in the various figures may be integrated on a single IC chip or distributed across multiple IC chips, which are packaged together or separately.

Figure 2:
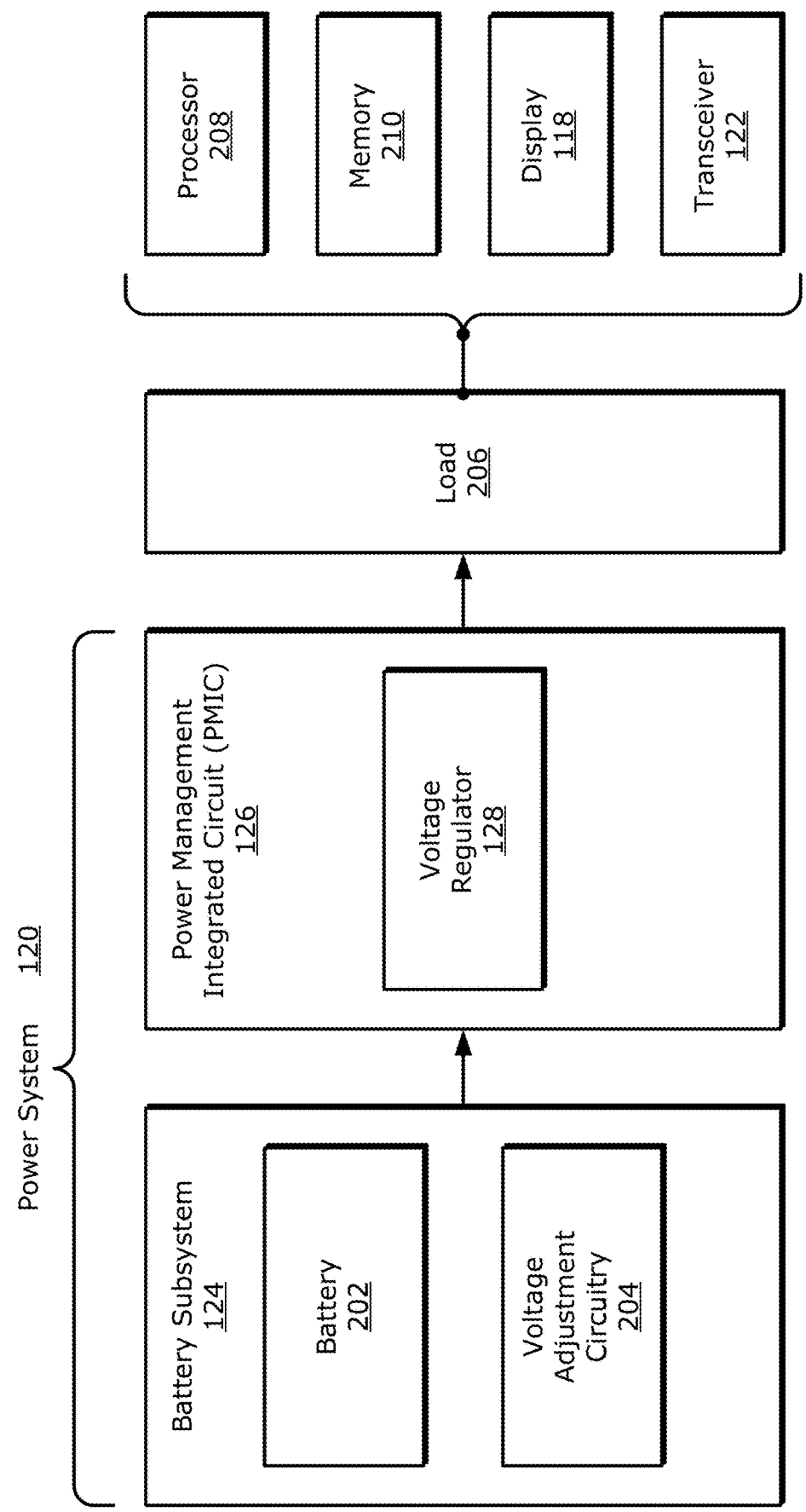
FIG. 2 illustrates an example battery subsystem that includes at least one battery and voltage adjustment circuitry and that is coupled to one or more loads via a voltage regulator.
Figure 3:
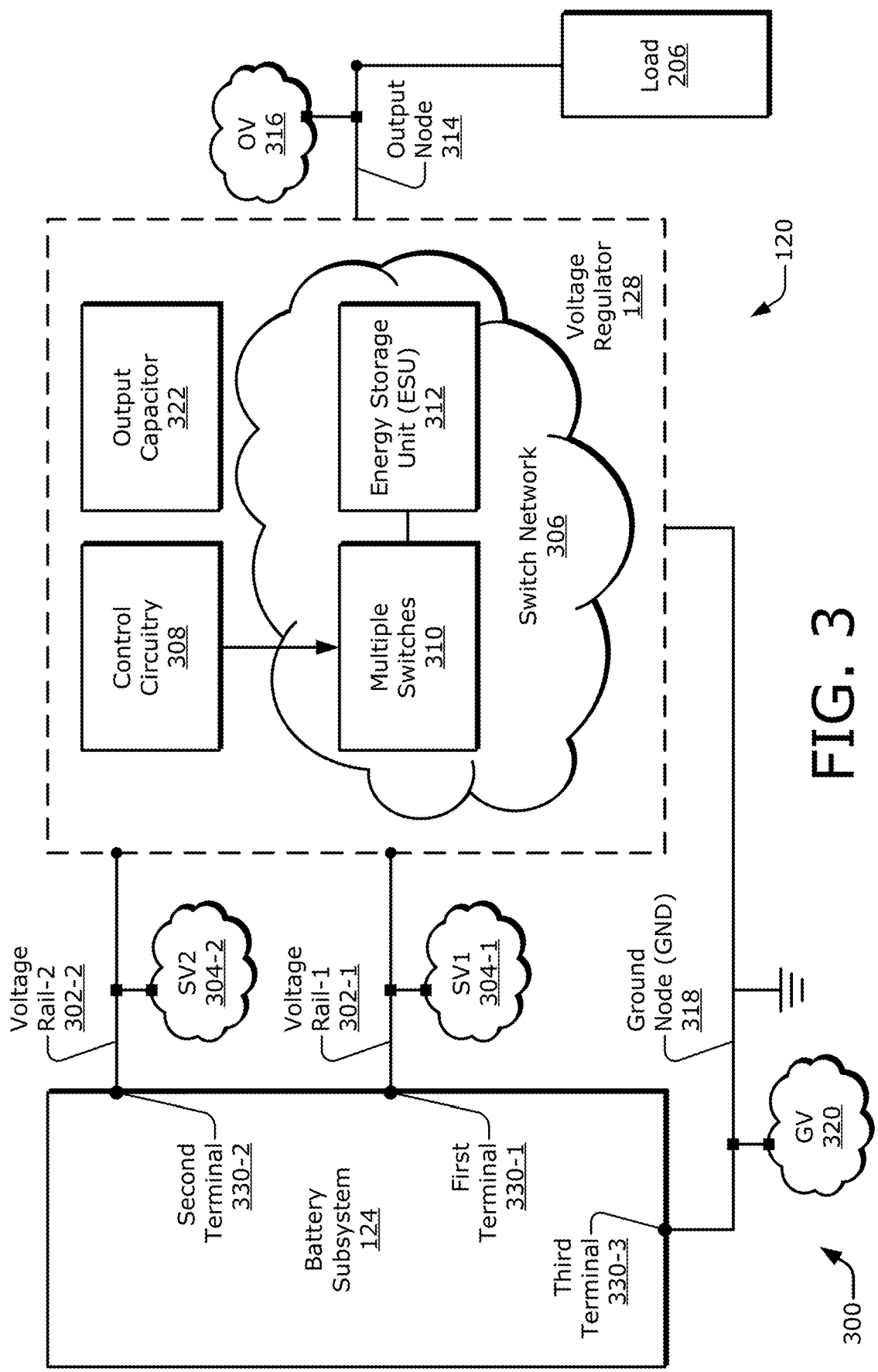
FIG. 3 is a schematic diagram of a power system illustrating an example voltage regulator and a battery subsystem.
Figures 1, 3:
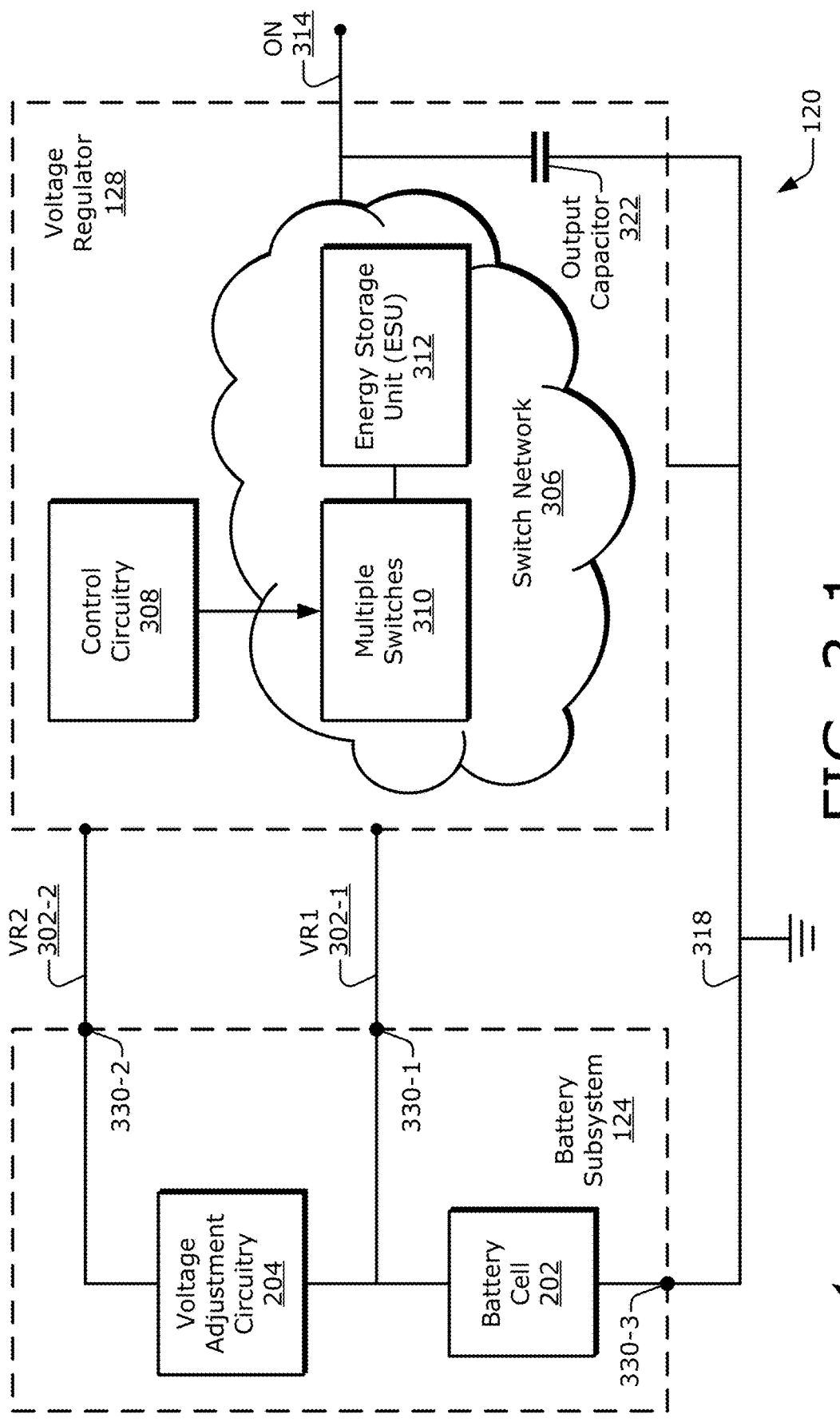
Figures 2, 3:
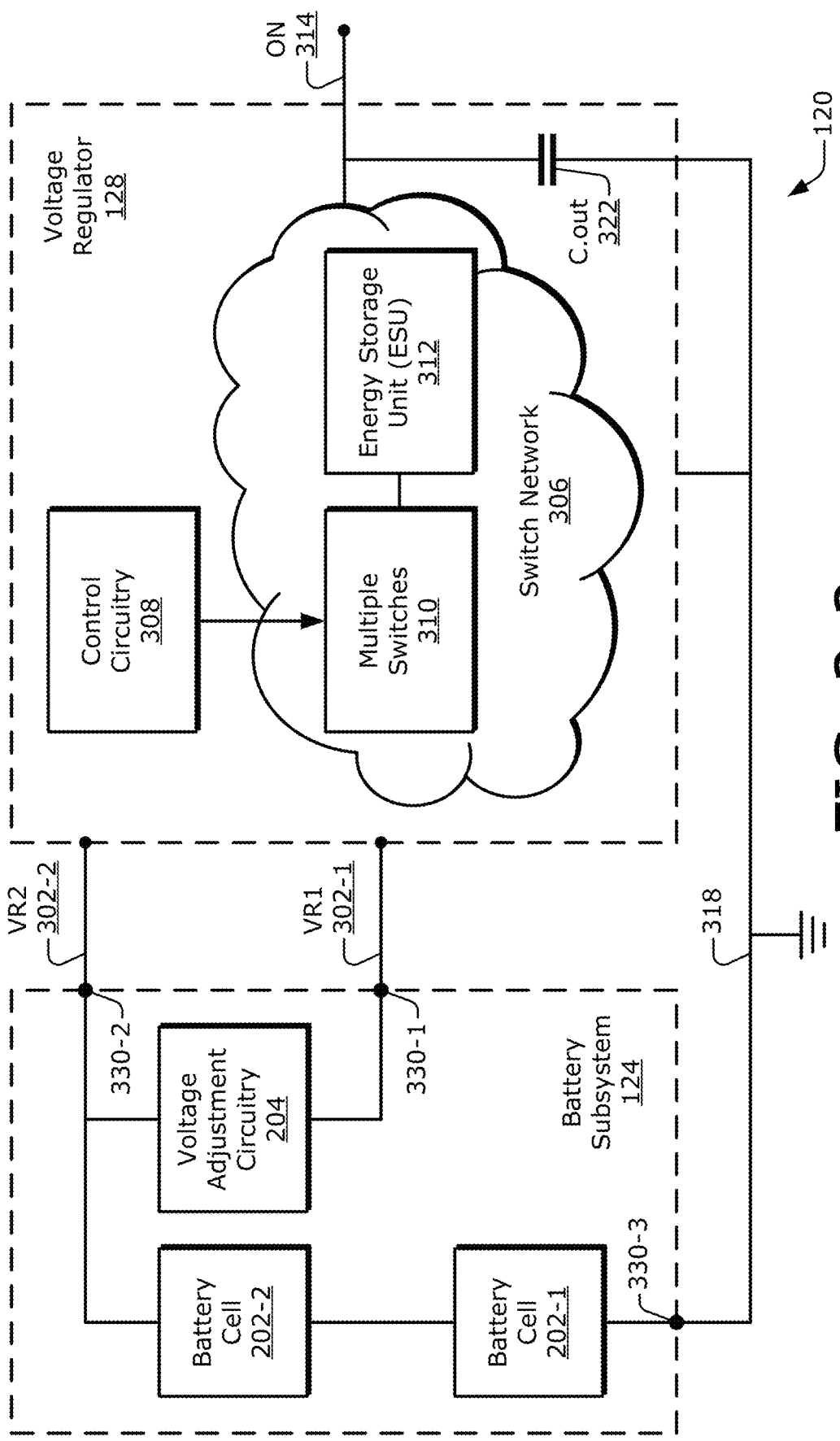
Figure 3:
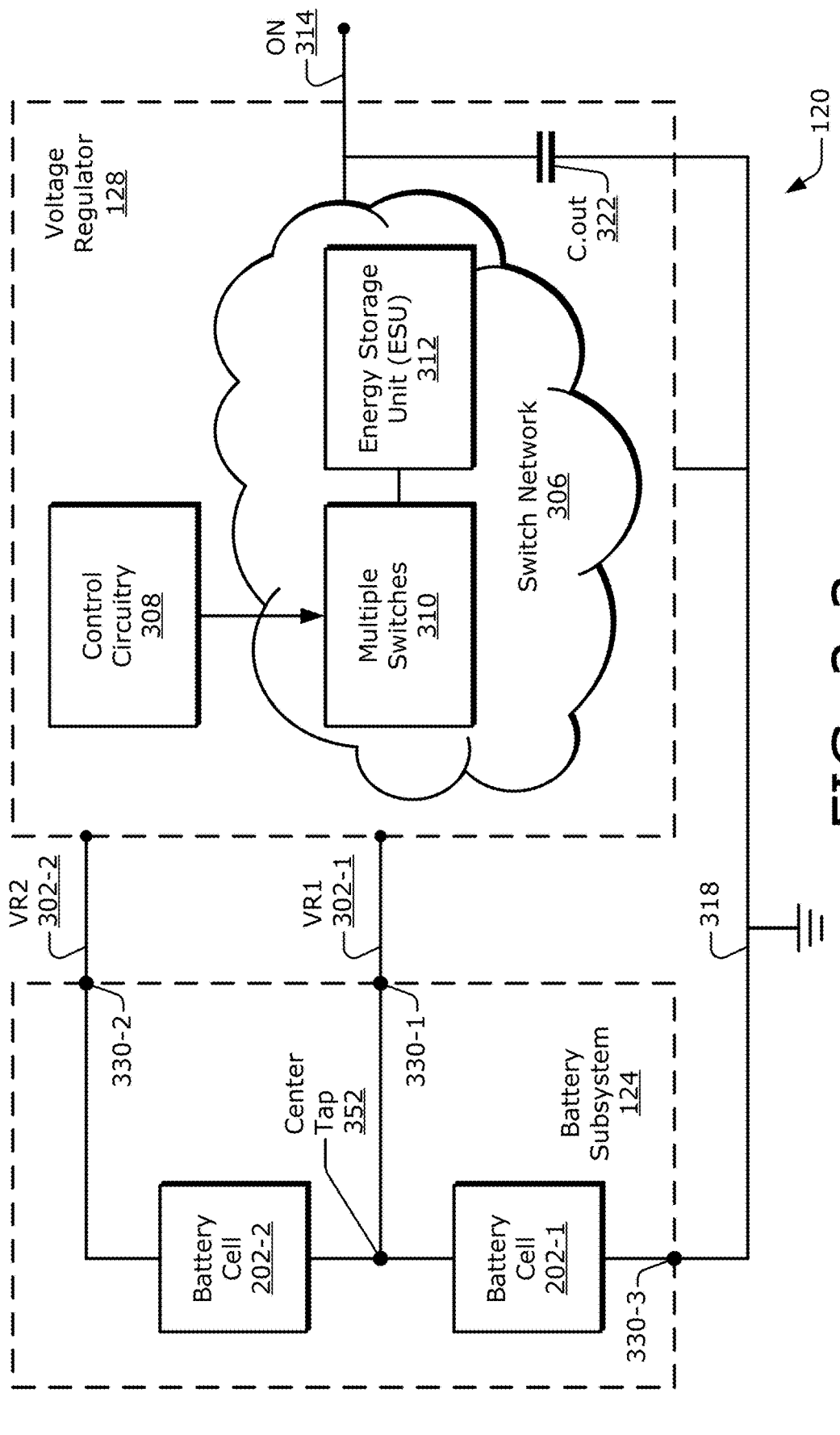
Figures 1, 4:
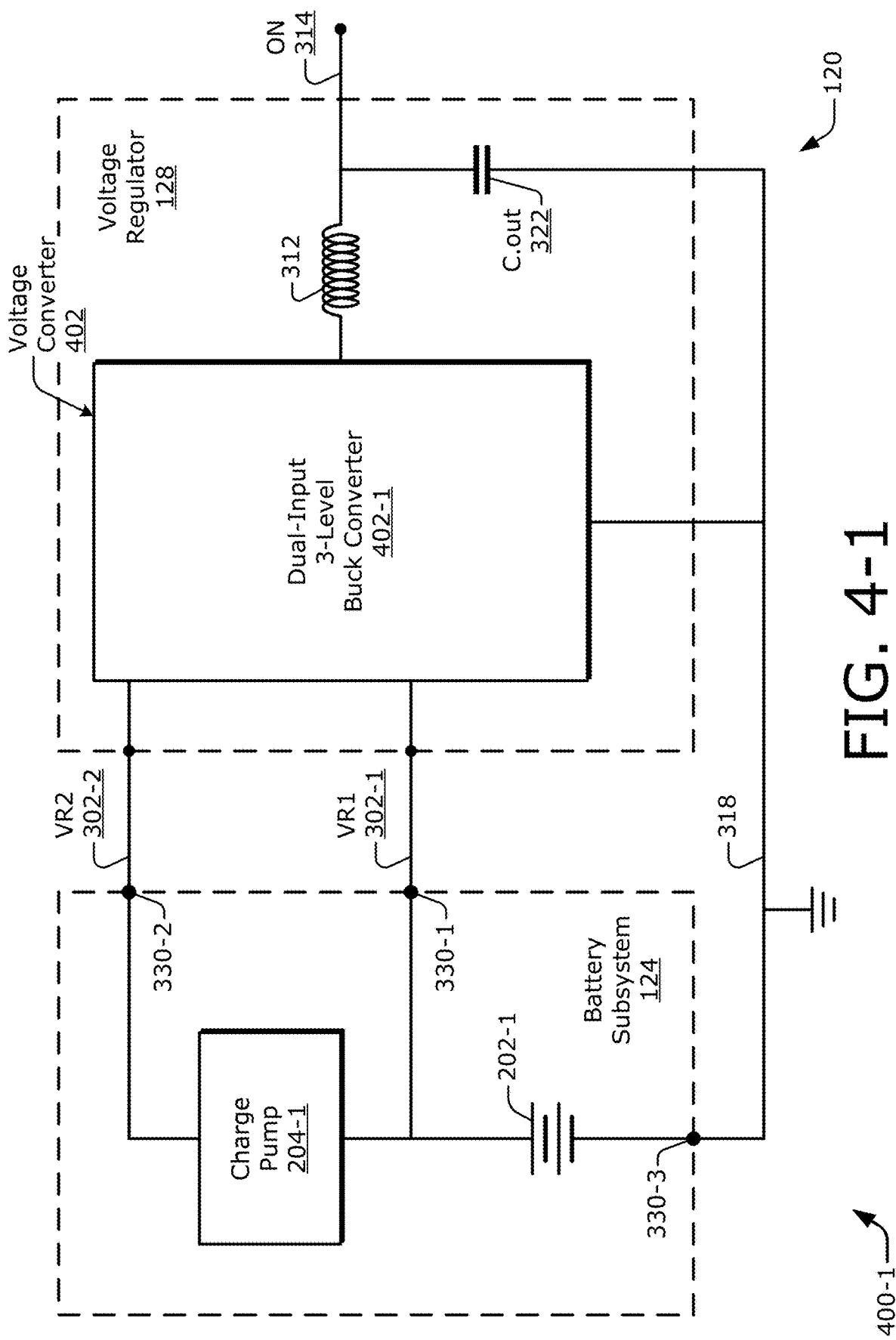
Figures 2, 4:
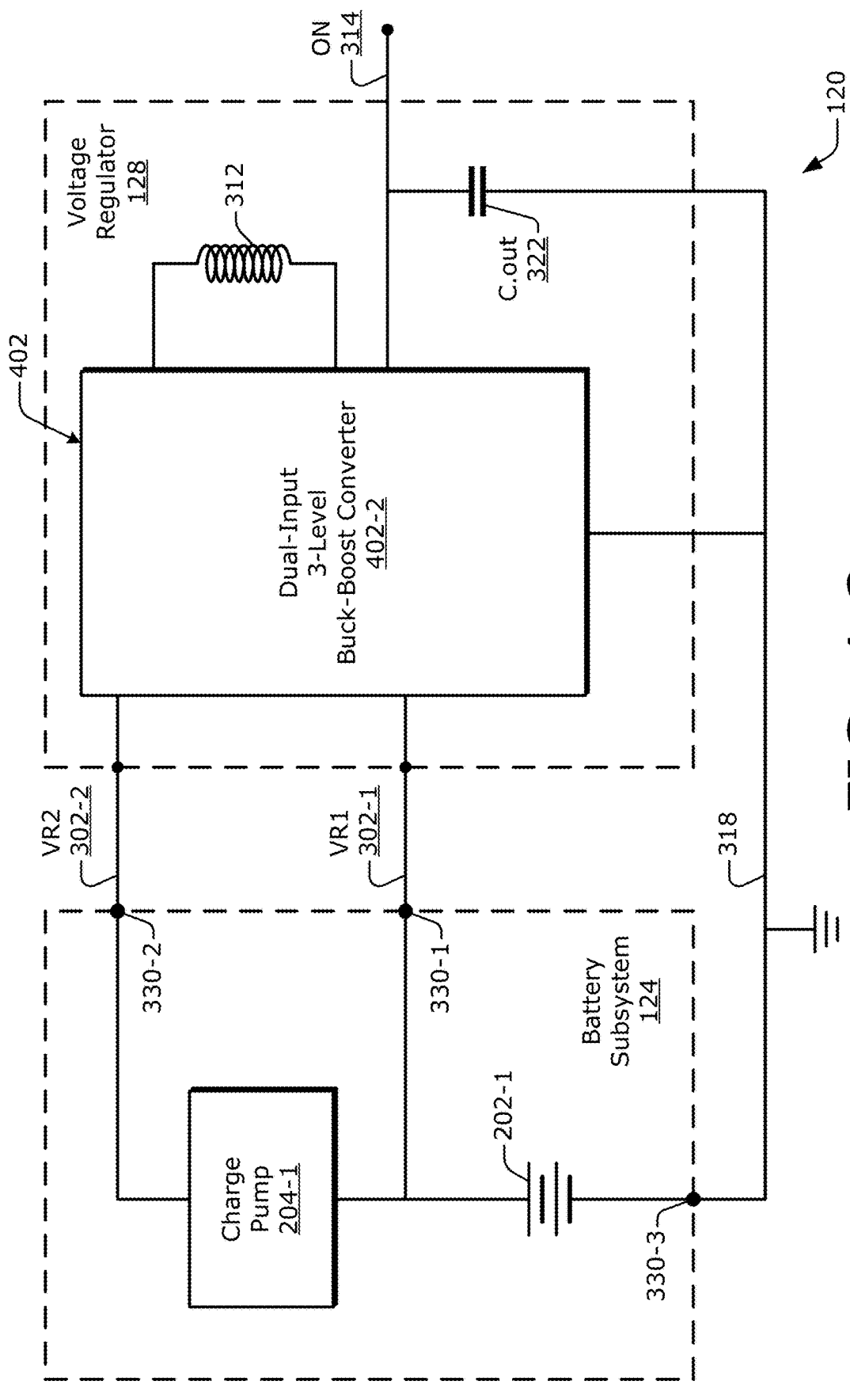
Figures 3, 4:
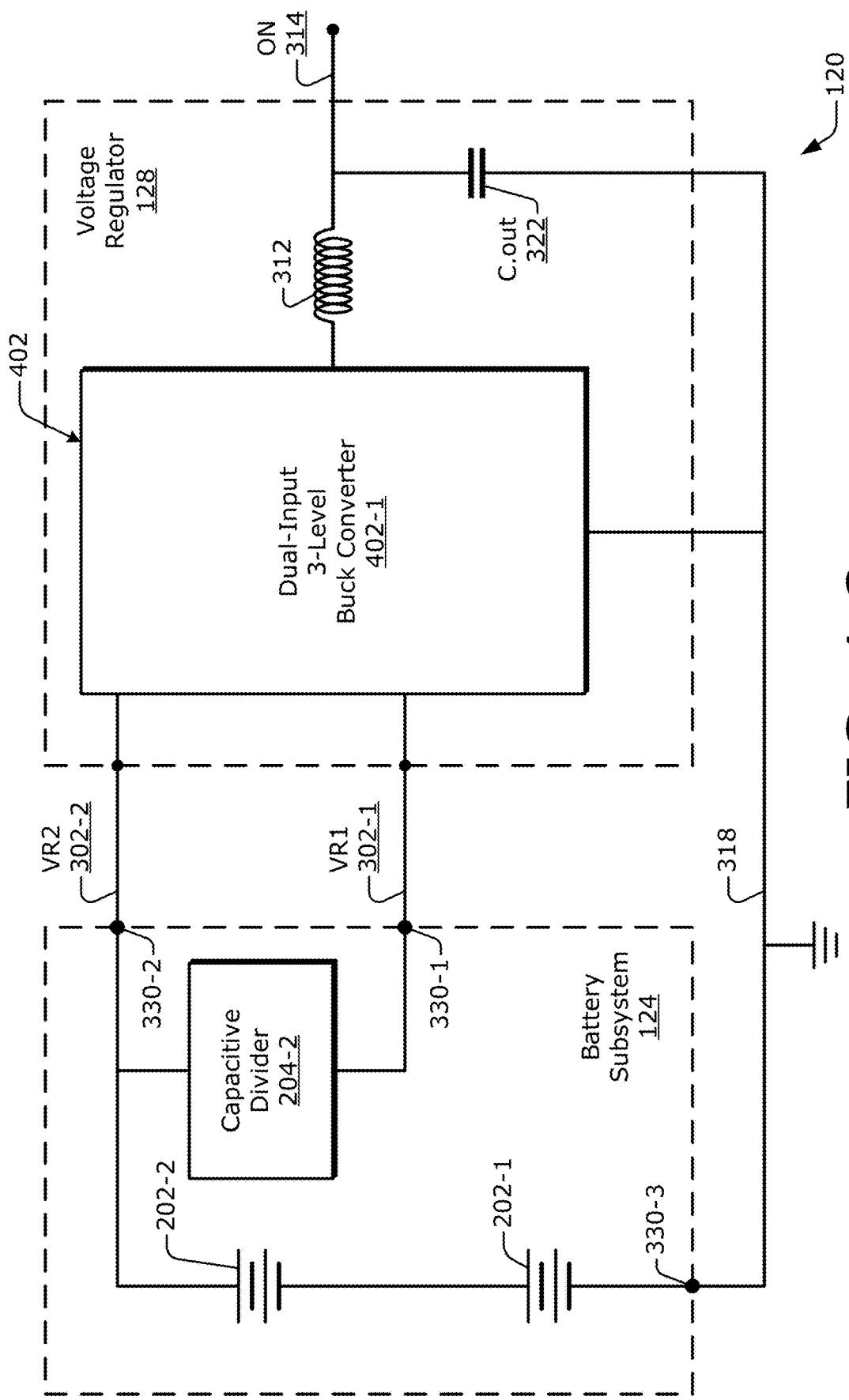
Figure 4:
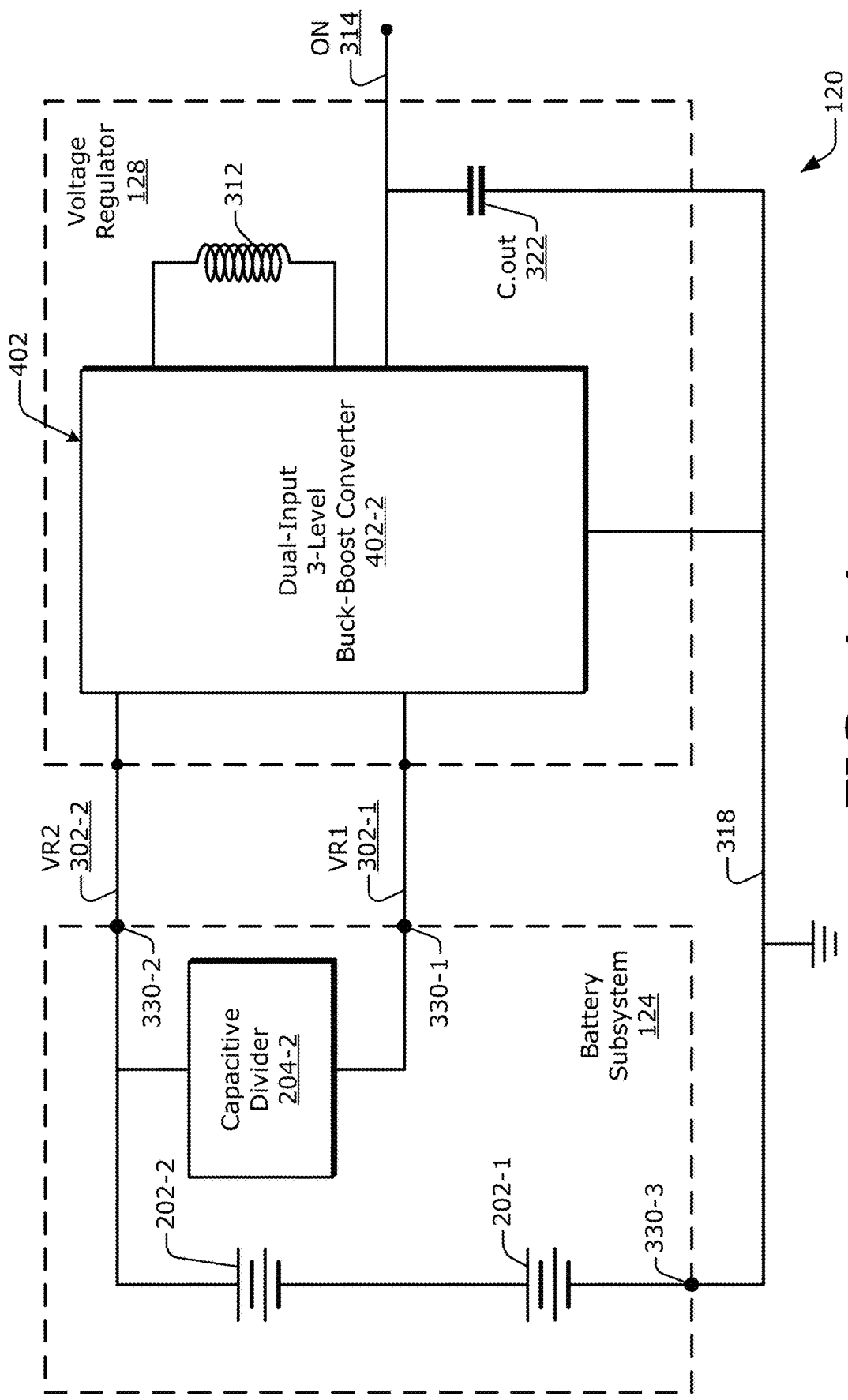
Figures 1, 5:
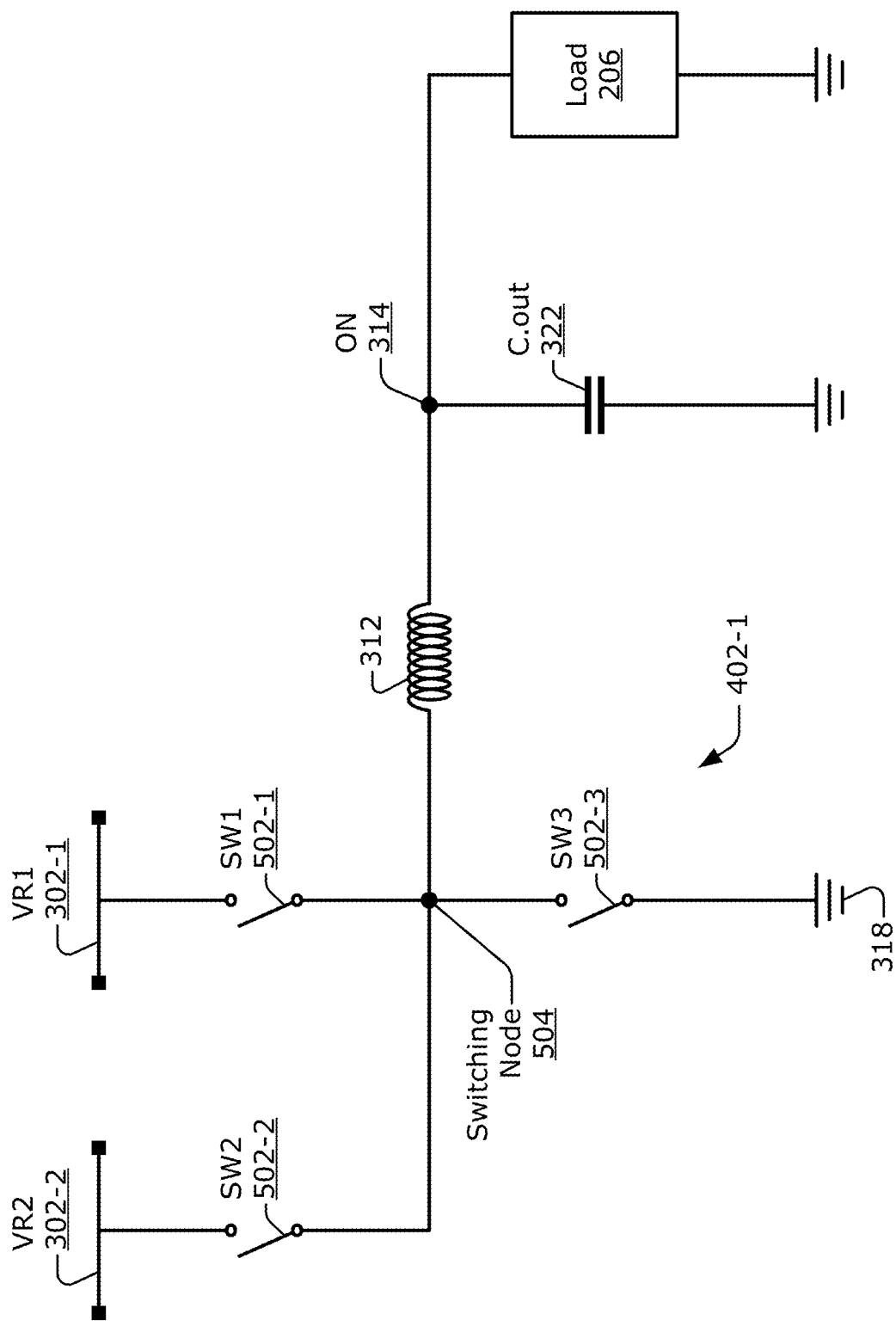
Figures 2, 5:
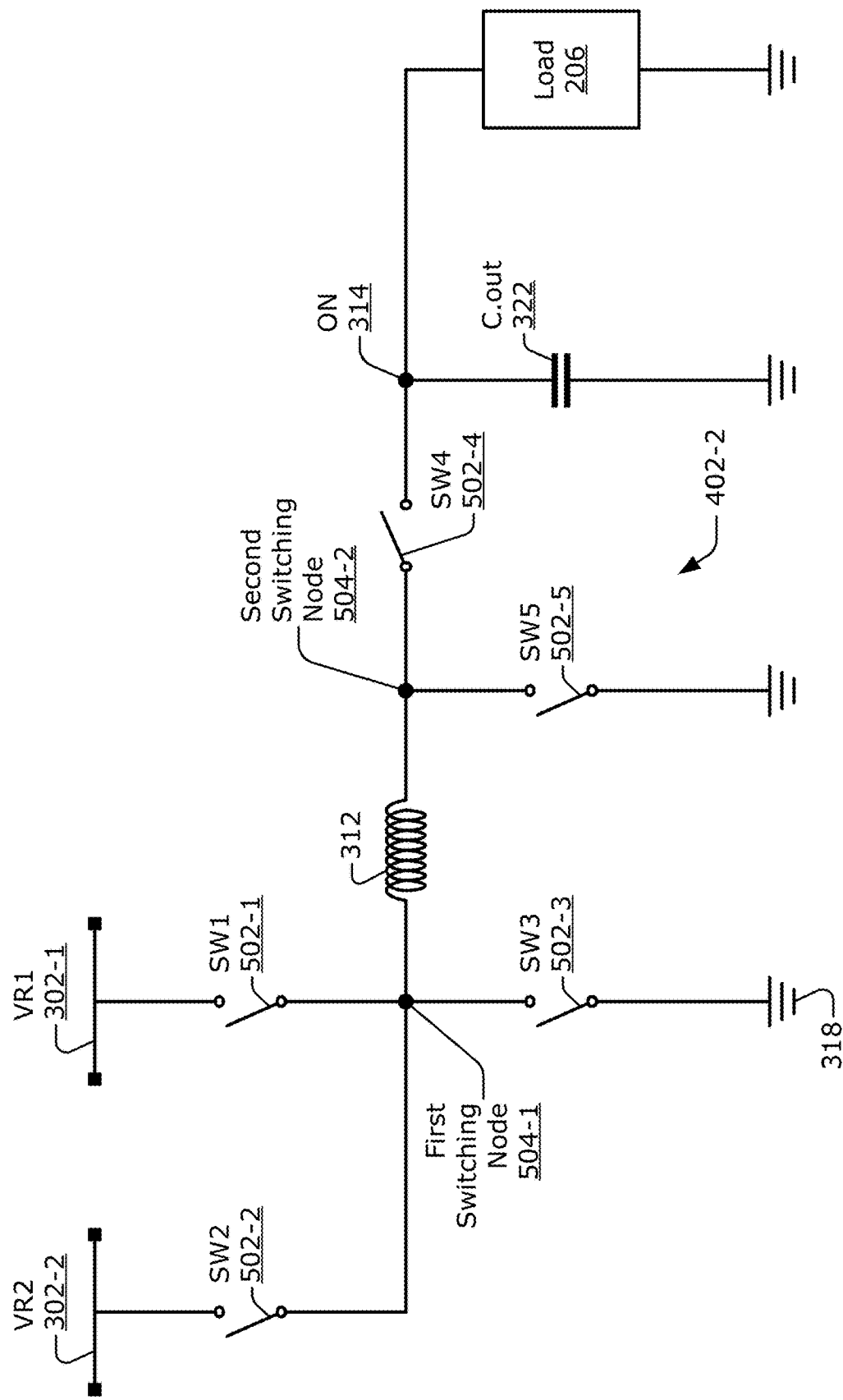
Figures 2, 6:
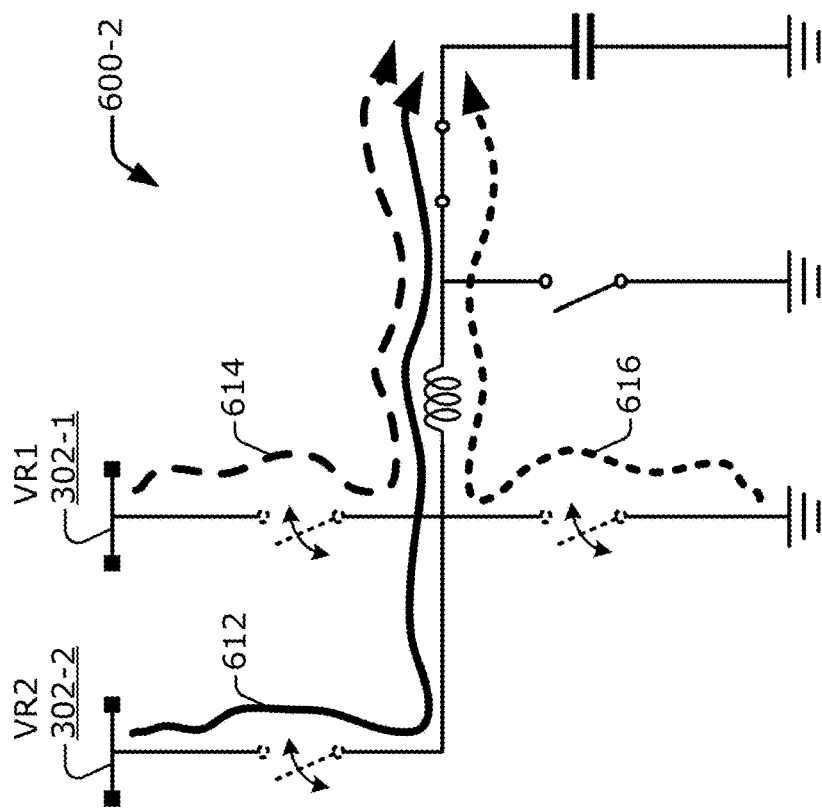
Figures 1, 6:
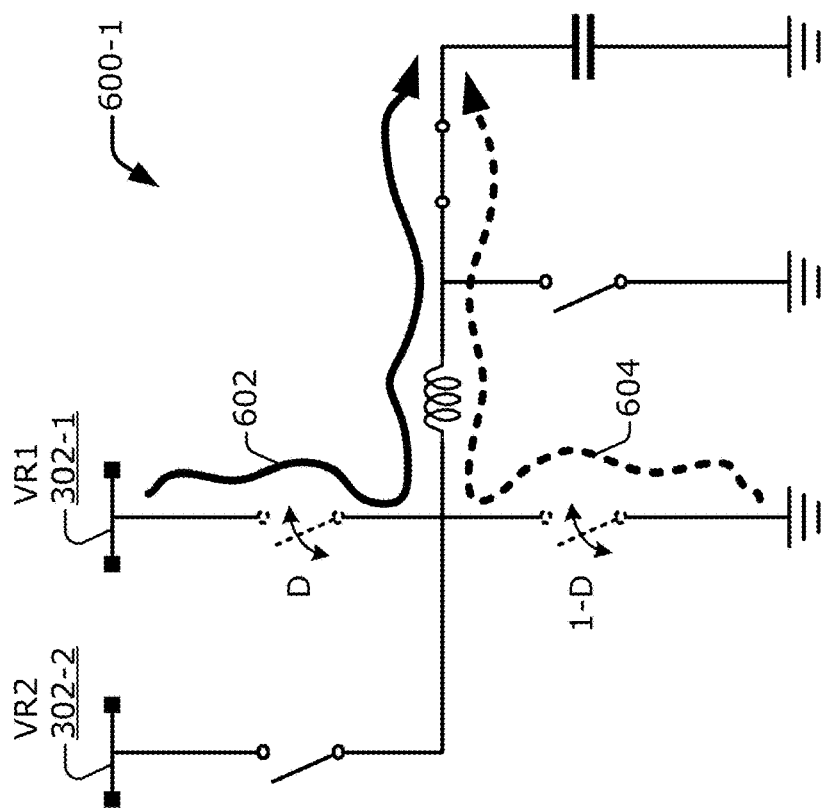
Figures 4, 6:
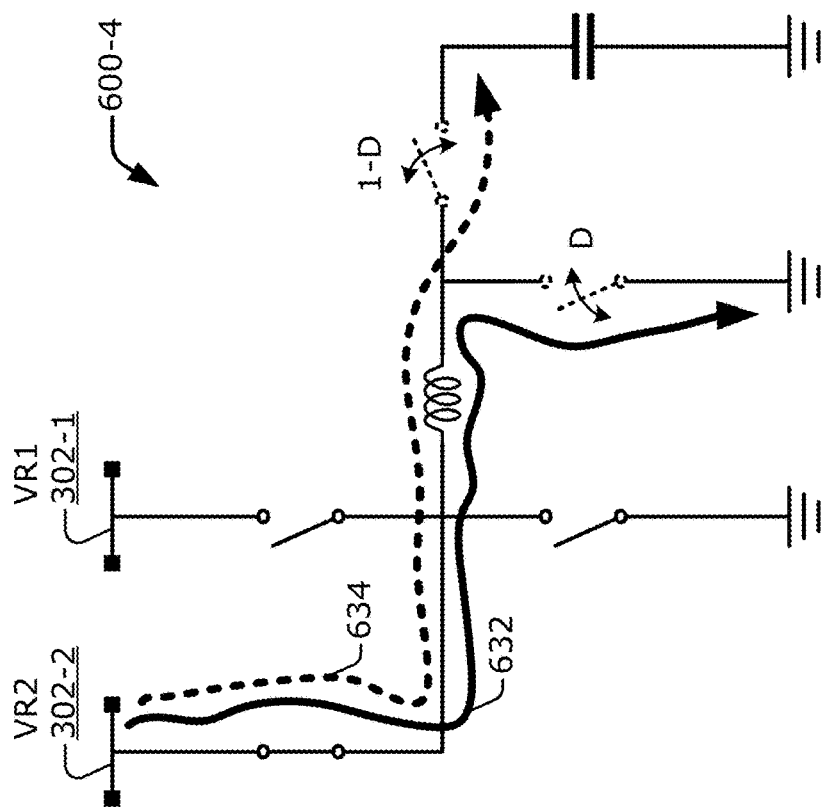
Figures 3, 6:
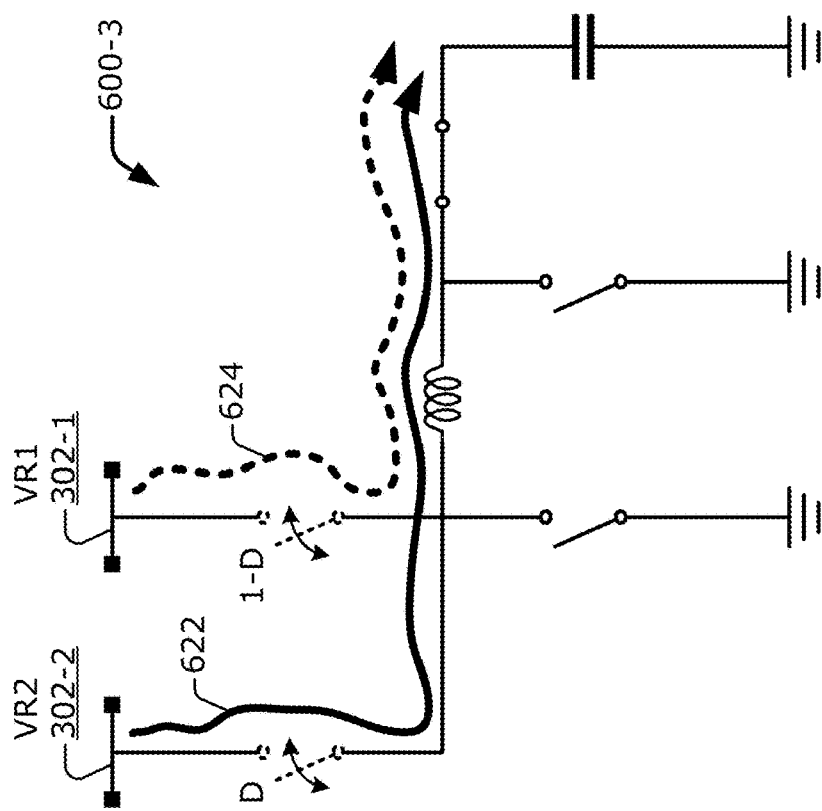
Figures 1, 7:
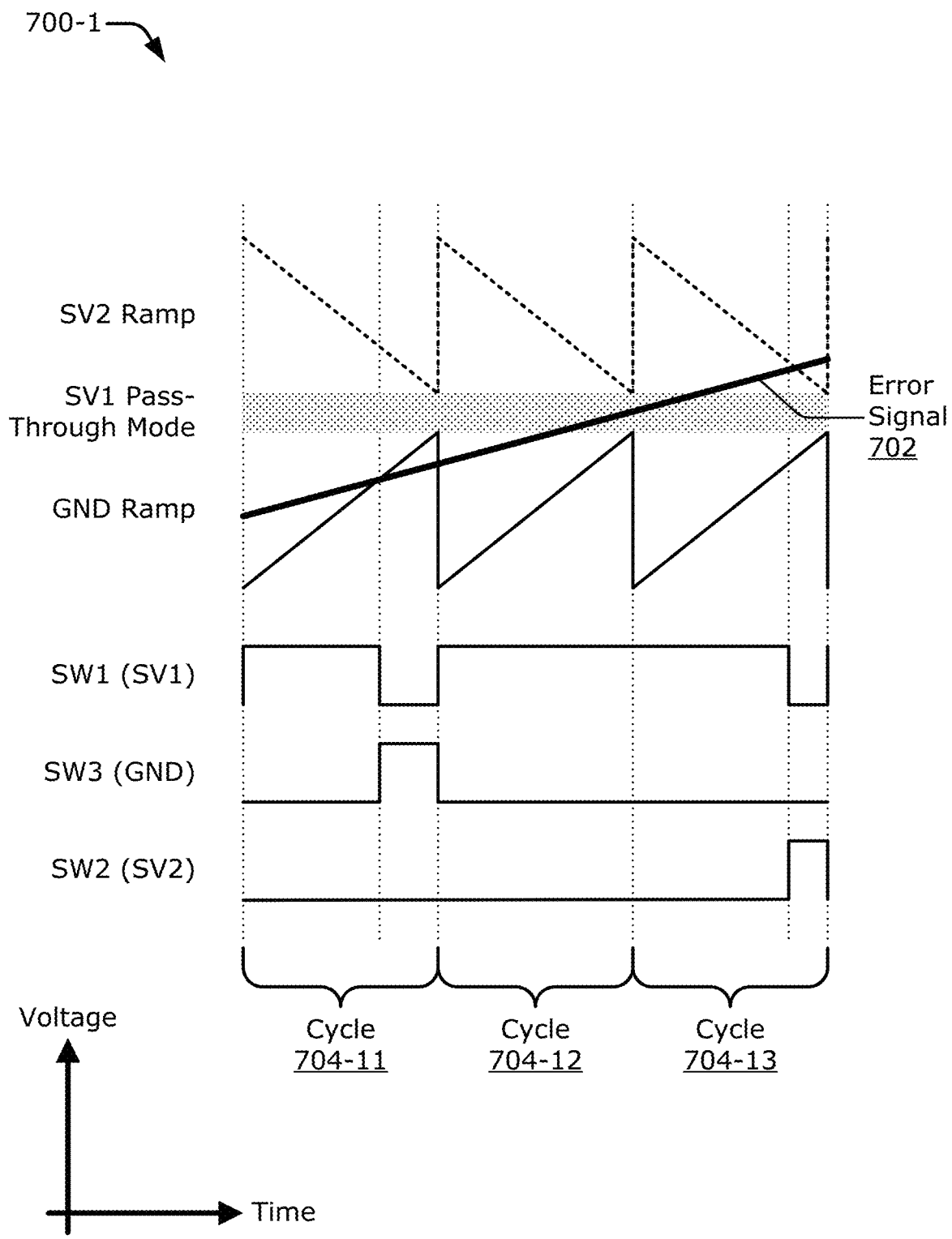
Figures 2, 7:
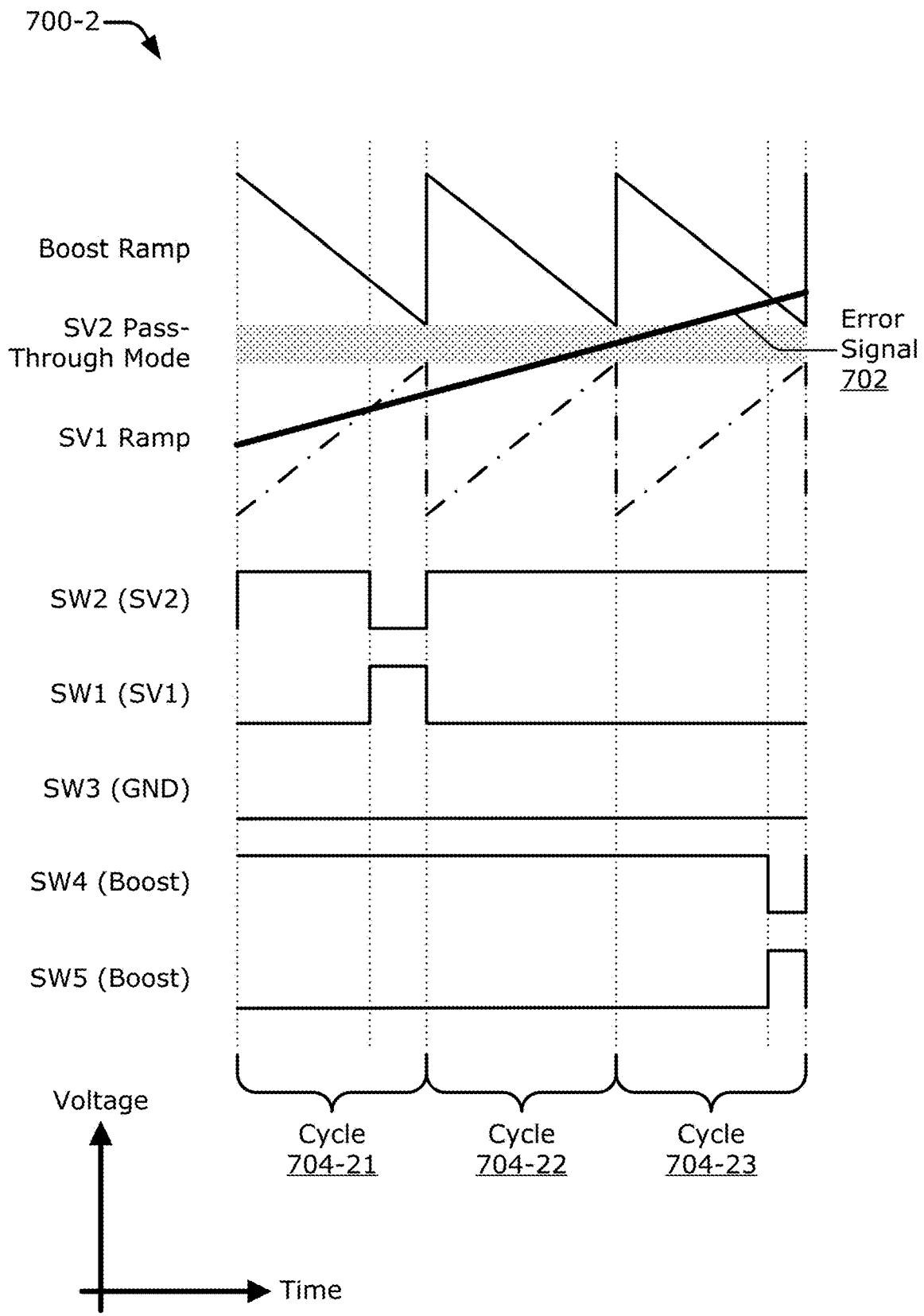
Figures 3, 7:
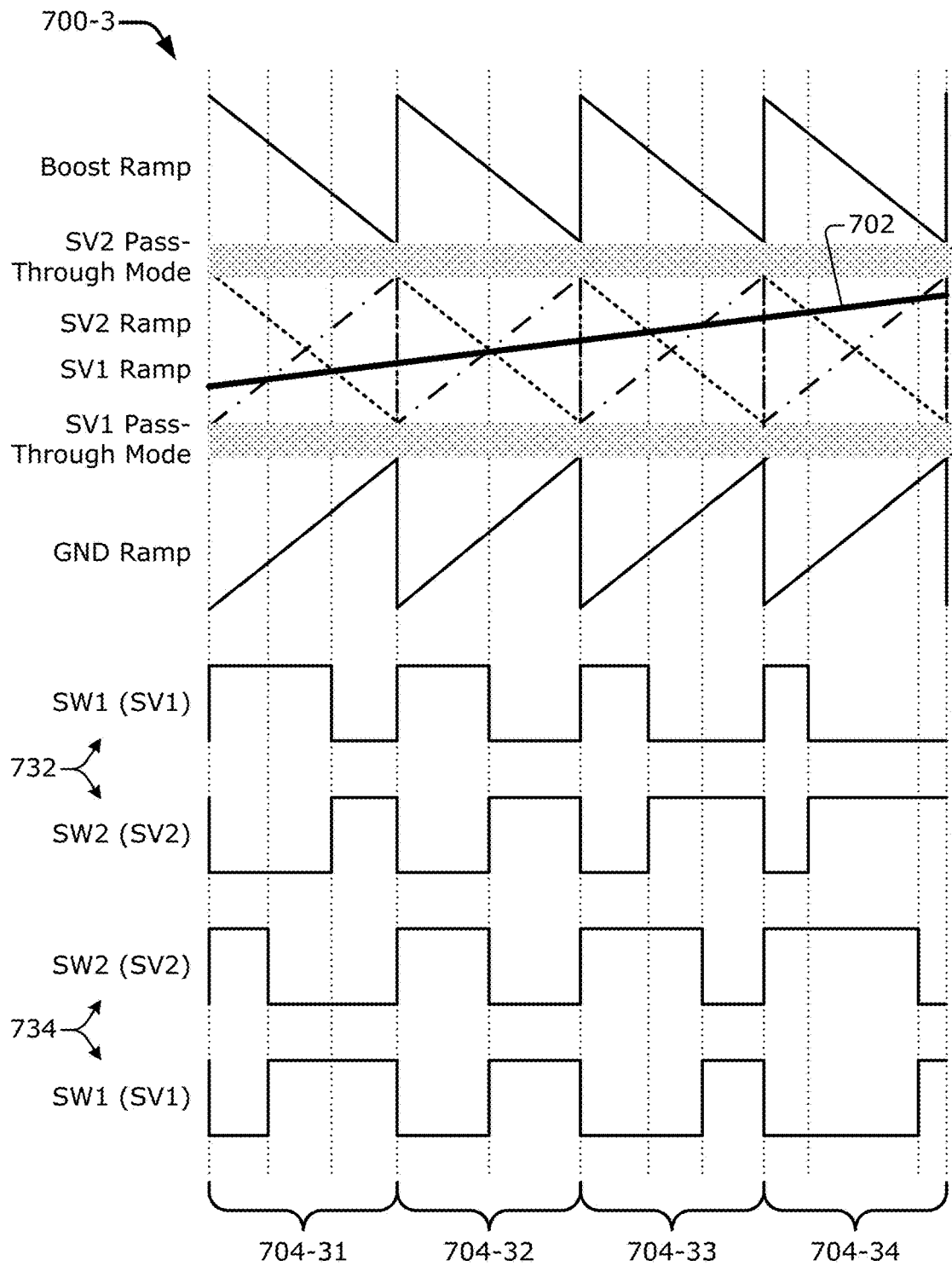
Figures 4, 7:
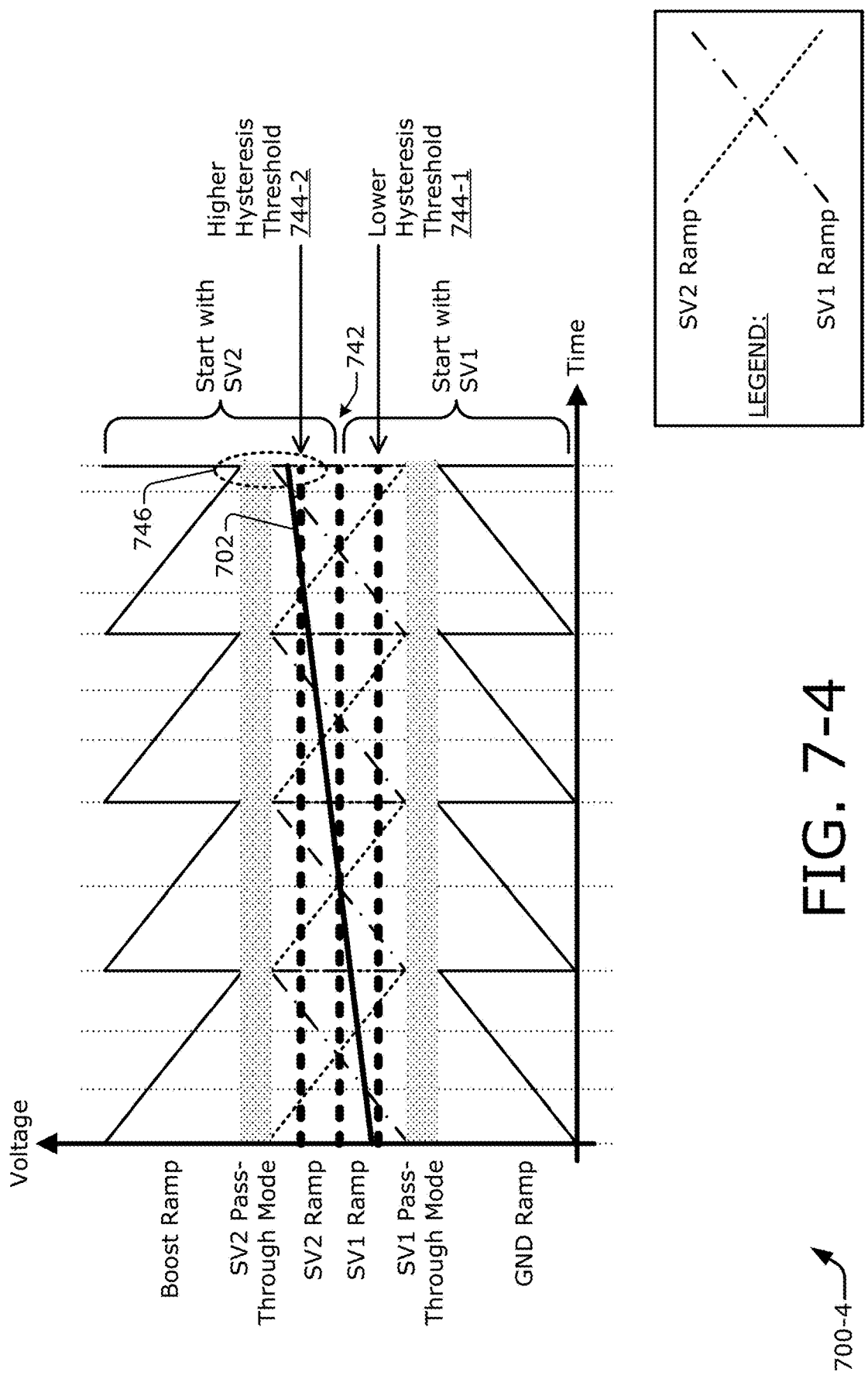
Figure 8:
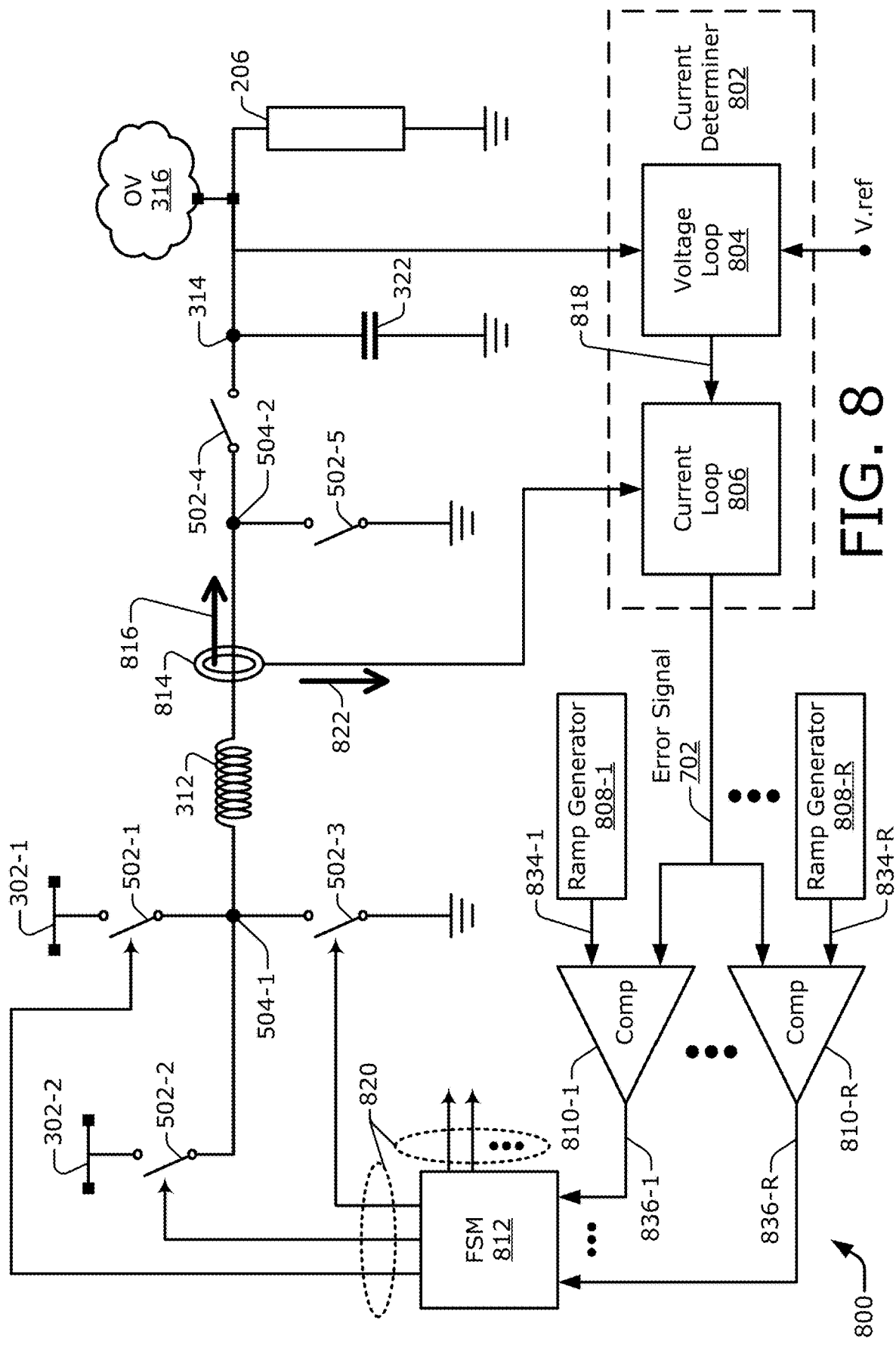
FIG. 8 is a circuit diagram illustrating example circuitry for a controller of a voltage regulator.
Figures 1, 8:
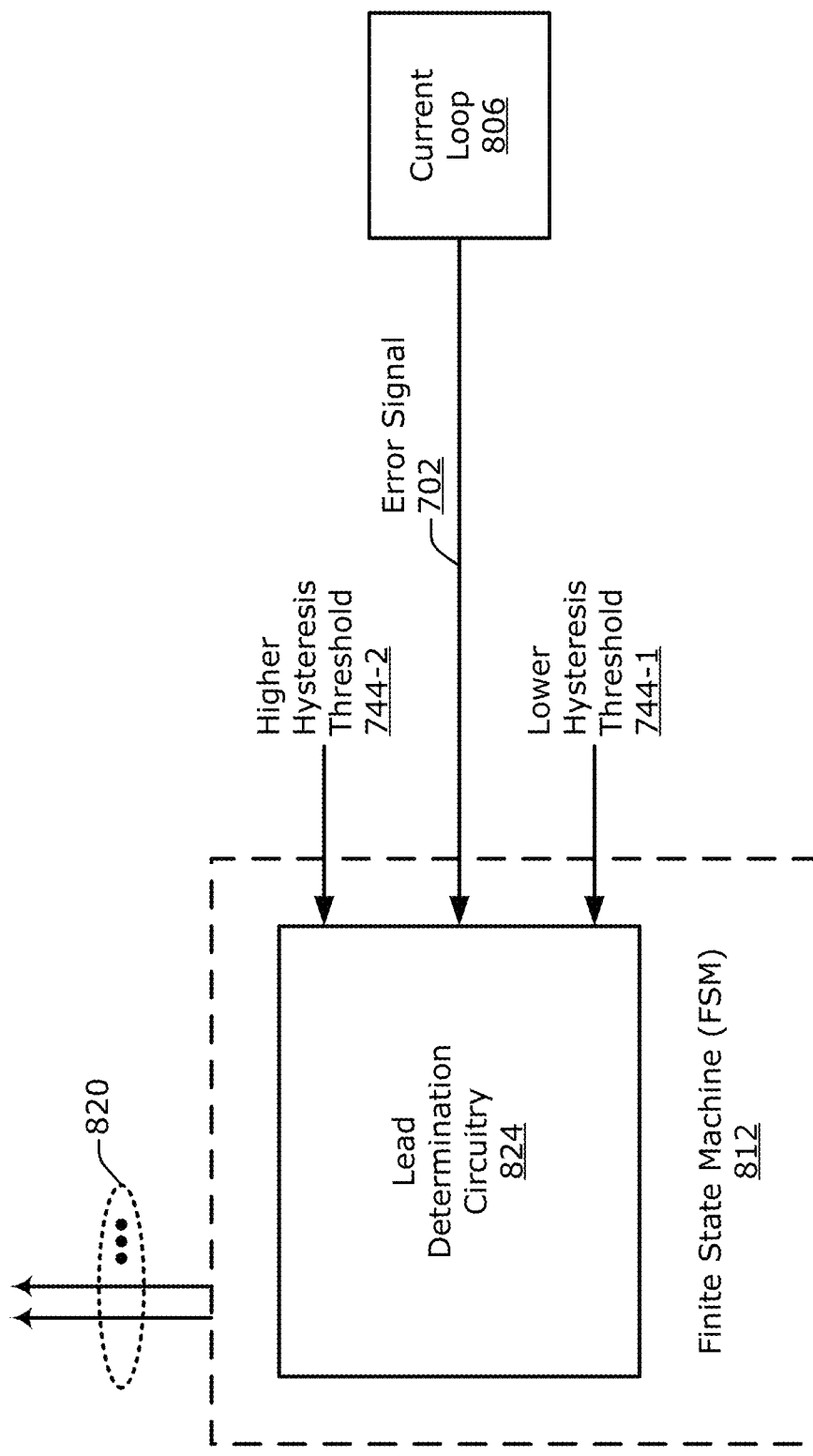
Figures 2, 8:
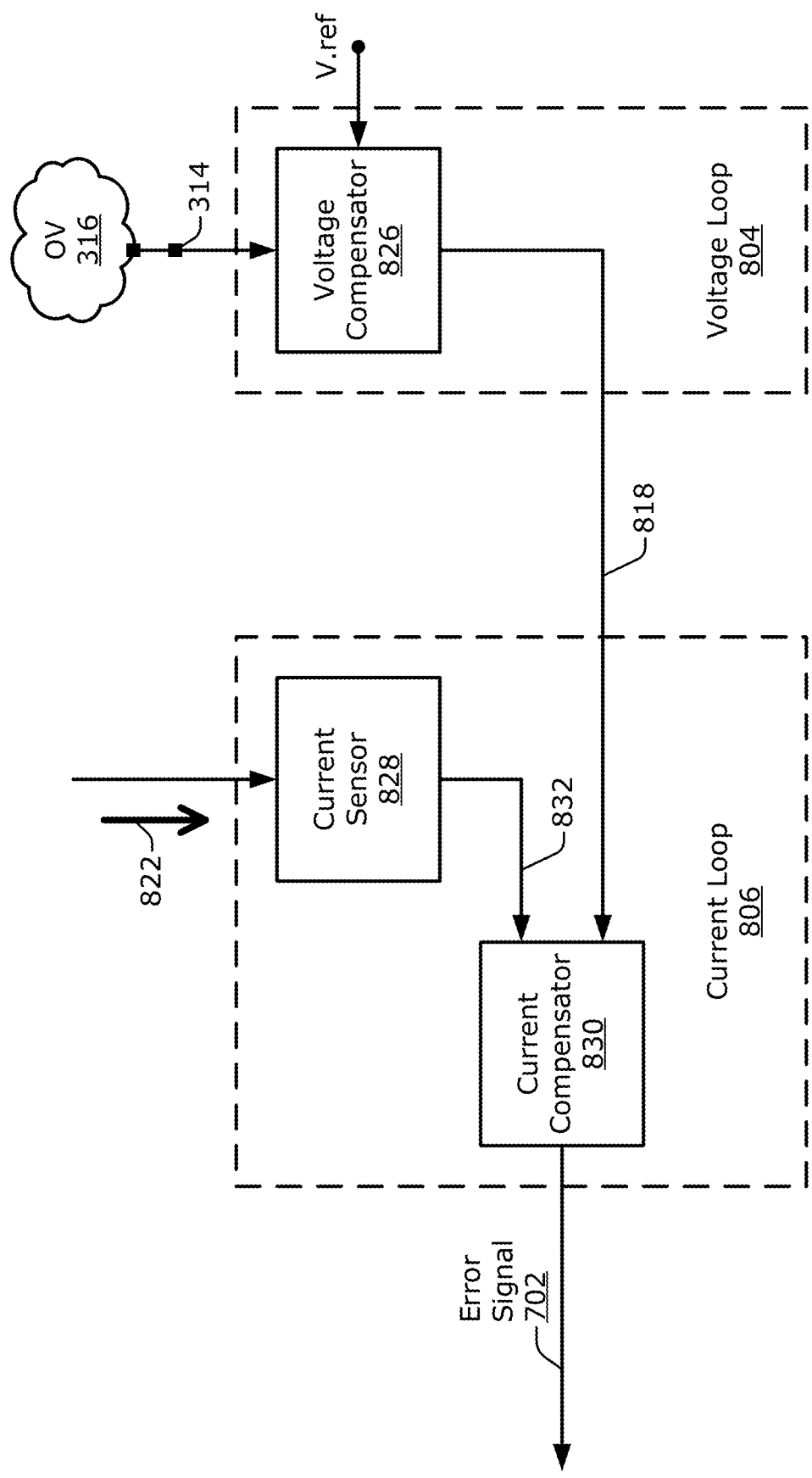

As described below, FIG. 2 depicts an example power system 120, which includes a battery subsystem 124 and a voltage regulator 128, in conjunction with at least one load. FIGS. 3 and 3-1 to 3-3 depict an example voltage regulator 128 and different example implementations of the battery subsystem 124. FIGS. 4-1 to 4-4 depict example buck and buck-boost converter implementations of the voltage regulator 128. FIGS. 5-1 and 5-2 depict example circuits for buck and buck-boost converters. FIGS. 6-1 to 6-4 depict example charging and discharging operations for bucking and boosting modes of a converter. FIGS. 7-1 to 7-4 depict example techniques that use two or more ramping signals to control the voltage regulator 128. FIG. 8 depicts an example circuit for a controller of the voltage regulator 128. Next, however, this document describes an example battery-based operational environment.

FIG. 2 illustrates an example battery subsystem 124 that includes at least one battery 202 and voltage adjustment circuitry 204. The battery subsystem 124 is coupled to one or more loads 206 via a voltage regulator 128 of a power management integrated circuit 126. The battery subsystem 124 and the voltage regulator 128 can jointly form at least part of a power system 120.

In example implementations, the battery subsystem 124 uses the battery 202 to provide power to the PMIC 126. The PMIC 126 uses the voltage regulator 128 to regulate a voltage of the power provided by the battery 202. The voltage regulator 128 is coupled to at least one load 206. Examples of the load 206 include a processor 208 (e.g., the application processor 108 of FIG. 1 or a modem processor) and a memory 210 (e.g., the CRM 110 of FIG. 1, integrated or separate video memory, or memory for a digital signal processor (DSP)). Other examples of the load 206 include the display 118 and the transceiver 122. Examples of the display 118 include an LED (e.g., AMOLED) display panel and a liquid crystal display (LCD) panel.

The battery subsystem 124 can be implemented in multiple manners. For example, the at least one battery 202 may include a single battery cell or multiple battery cells to provide two or more supply voltages. In some cases, the voltage adjustment circuitry 204 may increase a battery voltage to produce one of the supply voltages, but the voltage adjustment circuitry 204 may decrease a battery voltage in other cases to produce one of the supply voltages. Further, the voltage adjustment circuitry 204 may be omitted in some situations, like the one described below with reference to FIG. 3-3 in which a stacked-cell battery has a center tap. The battery 202 may be composed of at least one rechargeable material, such as lithium-ion, nickel-metal hydride, lead-acid, lithium-ion polymer, lithium iron phosphate, other types of lithium, and so forth. Although not shown, the battery 202 may be replaced with another type of power storage unit, such as a capacitor (e.g., a "supercapacitor"), for a power storage subsystem generally.

FIG. 3 is a schematic diagram 300 of a power system 120 illustrating an example voltage regulator 128 and a battery subsystem 124. As shown, the power system 120 includes an output node 314 (ON 314) and is coupled to the load 206 via the output node 314. In operation, the voltage regulator 128 holds the output node 314 at an output voltage 316 (OV 316), which is designed to deviate around a target voltage by no more than some threshold variance.

As shown, the battery subsystem 124 and the voltage regulator 128 can each be coupled to a ground node 318 that corresponds to a ground voltage 320 (GV 320). The power system 120 can include multiple voltage rails 302. In this example, the multiple voltage rails 302 have a quantity of two: a first voltage rail 302-1 (VR1 302-1) and a second voltage rail 302-2 (VR2 302-2). The battery subsystem 124 is coupled to the voltage regulator 128 via the first and second voltage rails 302-1 and 302-2.

In example implementations, the battery subsystem 124 includes multiple terminals 330, such as three terminals 330-1 to 330-3. In FIG. 3, the battery subsystem 124 includes a first terminal 330-1 that is coupled to the first voltage rail 302-1, a second terminal 330-2 that is coupled to the second voltage rail 302-2, and a third terminal 330-3 that is coupled to the ground node 318. In example operations, the battery subsystem 124 holds the first voltage rail 302-1 to a first supply voltage 304-1 (SV1 304-1) and the second voltage rail 302-2 to a second supply voltage 304-2 (SV2 304-2). Although not shown, the power system 120 can include more voltage rails 302, and the battery subsystem 124 may respectively generate a supply voltage 304 for each voltage rail 302.

The voltage regulator 128 can accept the first and second supply voltages 304-1 and 304-2 on the first and second voltage rails 302-1 and 302-2, respectively. As described herein, the voltage regulator 128 can produce the output voltage 316 on the output node 314 using the first and second supply voltages 304-1 and 304-2. To do so, the voltage regulator 128 can include at least one switch network 306, control circuitry 308, and at least one output capacitor 322. The switch network 306 can include multiple switches 310 and at least one energy storage unit 312 (ESU 312). In operation, the control circuitry 308 opens and closes one or more switches of the multiple switches 310 to selectively couple the energy storage unit 312 to the first voltage rail 302-1, the second voltage rail 302-2, or the ground node 318.

Examples of the multiple switches 310 are described below with reference to FIGS. 5-1 and 5-2. Example control techniques are described below with reference to FIGS. 6-1 to 6-4 and 7-1 to 7-4. Examples of the control circuitry 308 are described below with reference to FIG. 8. Next, however, this document describes example implementations of the battery subsystem 124 with reference to FIGS. 3-1 to 3-3. In each of FIGS. 3-1 to 3-3, the output capacitor 322 is shown coupled between the output node 314 and the ground node 318, and the battery subsystem 124 includes at least one battery cell 202. Using any of these described or illustrated approaches for the battery subsystem 124, or another approach, the battery subsystem 124 can provide the first supply voltage 304-1 on the first voltage rail 302-1 and the second supply voltage 304-2 on the second voltage rail 302-2.

FIG. 3-1 is a schematic diagram 300-1 of a power system 120 illustrating an example battery subsystem 124 with one battery cell 202 and voltage adjustment circuitry 204. In these example implementations, the battery cell 202 and the voltage adjustment circuitry 204 are coupled together in series between the second terminal 330-2 and the third terminal 330-3. The battery cell 202 is coupled between the third terminal 330-3 and the first terminal 330-1. The voltage adjustment circuitry 204 is coupled between the first terminal 330-1 and the second terminal 330-2. In operation, the voltage adjustment circuitry 204 can raise a voltage level provided by the battery cell 202 at the first terminal 330-1 to another, higher voltage level at the second terminal 330-2.

FIG. 3-2 is a schematic diagram 300-2 of a power system 120 illustrating an example battery subsystem 124 with two battery cells 202 and voltage adjustment circuitry 204. In these example implementations, the battery includes a first battery cell 202-1 and a second battery cell 202-2. The first and second battery cells 202-1 and 202-2 are coupled together in series between the second terminal 330-2 and the third terminal 330-3 and together form a stacked-cell battery. The voltage adjustment circuitry 204 is coupled between the first terminal 330-1 and the second terminal 330-2. In operation, the voltage adjustment circuitry 204 can lower a voltage level provided by the stacked battery cells 202-1 and 202-2 at the second terminal 330-2 to another, lower voltage level at the first terminal 330-1.

FIG. 3-3 is a schematic diagram 300-3 of a power system 120 illustrating an example battery subsystem 124 with two battery cells 202 and a center tap 352. In these example implementations, the battery includes a first battery cell 202-1 and a second battery cell 202-2. The first and second battery cells 202-1 and 202-2 are coupled together in series between the second terminal 330-2 and the third terminal 330-3 and jointly form a stacked-cell battery. The stacked-cell battery includes or is coupled to the center tap 352, which is coupled to the first voltage rail 302-1 via the first terminal 330-1. Due to the center tap 352, the first battery cell 202-1 is coupled between the third terminal 330-3 and the first terminal 330-1, and the second battery cell 202-2 is coupled between the first terminal 330-1 and the second terminal 330-2. As shown, the battery subsystem 124 of FIG. 3-3 can omit voltage adjustment circuitry 204 and still provide two different supply voltages on two voltage rails: the first and second voltage rails 302-1 and 302-2. In operation, the stacked battery cells 202-1 and 202-2 provide a relatively lower voltage level at the first terminal 330-1 via the center tap 352 and a relatively higher voltage at the second terminal 330-2.

FIGS. 4-1 to 4-2 illustrate example power system implementations. In each diagram, the energy storage unit 312 is depicted, by way of example, as at least one inductor. Each voltage regulator 128 includes at least one voltage converter 402. The voltage converter 402 can include, for example, control circuitry 308 and multiple switches 310, as shown in FIG. 3. Each voltage converter 402 may be realized, for instance, as a dual-input three-level voltage converter. Buck and buck-boost converters are described below.

Further, single-cell and stacked-cell battery schemes are depicted. The voltage adjustment circuitry 204 can be realized, for example, as at least one charge pump 204-1 to increase a voltage level or as at least one capacitive divider 204-2 to decrease a voltage level. Although not depicted in any of FIGS. 4-1 to 4-4, the multicell battery implementation of FIG. 3-3 having the center tap 352 can be employed with a dual-input three-level buck converter 402-1 or a dual-input three-level buck-boost converter 402-2.

FIGS. 4-1 and 4-2 are schematic diagrams 400-1 and 400-2 illustrating example battery subsystems 124 with a single-cell battery 202-1 and a charge pump 204-1. The battery subsystem 124 can be coupled to a buck converter 402-1 as shown in FIG. 4-1 or to a buck-boost converter 402-2 as shown in FIG. 4-2. In example implementations, the charge pump 204-1 is coupled between the first terminal 330-1 and the second terminal 330-2 in both diagrams. The battery cell 202-1 is coupled between the third terminal 330-3 and the first terminal 330-1.

In example operations, the battery cell 202-1 establishes a first voltage level (e.g., the first supply voltage 304-1 of FIG. 3) on the first voltage rail 302-1 via the first terminal 330-1. The charge pump 204-1 increases the first voltage level to a second voltage level. In some cases, the voltage increase is a multiple of the first voltage level, such as a doubling or a two-times multiple. In such cases, the second voltage level may be approximately twice the first voltage level. The charge pump 204-1 establishes the second voltage level (e.g., the second supply voltage 304-2 of FIG. 3) on the second voltage rail 302-2 via the second terminal 330-2.

As indicated in FIG. 4-1, the energy storage unit 312 can be coupled to the buck converter 402-1 via at least one switching node "prior" to the output node 314, based on a direction in which power is provided. As indicated in FIG. 4-2, the energy storage unit 312 can be coupled to the buck-boost converter 402-2 via at least two switching nodes "prior" to the output node 314. These switching nodes are depicted in the example circuit diagrams of FIGS. 5-1 and 5-2. In some aspects, the circuitry used to implement a charge pump 204-1 can be used analogously to implement a capacitive divider 204-2, with the voltage adjustment direction being flipped.

FIGS. 4-3 and 4-4 are schematic diagrams 400-3 and 400-4 illustrating example battery subsystems 124 with a stacked-cell battery 202-1/202-2 and a capacitive divider 204-2. The battery subsystem 124 can be coupled to a buck converter 402-1, as shown in FIG. 4-3, or to a buck-boost converter 402-2, as shown in FIG. 4-4. In example implementations, the capacitive divider 204-2 is coupled between the first terminal 330-1 and the second terminal 330-2 in both diagrams. The two battery cells 202-1 and 202-2 are coupled together in series between the third terminal 330-3 and the second terminal 330-2.

In example operations, the stacked battery cells 202-1 and 202-2 establish a second voltage level (e.g., the second supply voltage 304-2 of FIG. 3) on the second voltage rail 302-2 via the second terminal 330-2. The capacitive divider 204-2 decreases the second voltage level to a first voltage level. In some cases, the voltage decrease is a fraction of the second voltage level, such as a halving or a division by two. The capacitive divider 204-2 establishes the first voltage level (e.g., the first supply voltage 304-1 of FIG. 3) on the first voltage rail 302-1 via the first terminal 330-1.

As indicated in FIG. 4-3, the energy storage unit 312 can be coupled to the buck converter 402-1 via at least one switching node "prior" to the output node 314. As indicated in FIG. 4-4, the energy storage unit 312 can be coupled to the buck-boost converter 402-2 via at least two switching nodes "prior" to the output node 314. These switching nodes are depicted in the example circuit diagrams of FIGS. 5-1 and 5-2. As illustrated across FIGS. 4-1 to 4-4, each dual-input voltage converter 402 has two inputs; a respective one of each of the two inputs is coupled to a respective terminal of the battery subsystem 124 via a respective voltage rail 302. These dual inputs are depicted in the circuits of FIGS. 5-1 and 5-2.

FIG. 5-1 is a circuit diagram 500-1 illustrating an example buck converter 402-1 for a voltage regulator that is coupled to a load 206. In example buck implementations, the multiple switches 310 (e.g., of FIG. 3) can include at least three switches 502: a first switch 502-1 (SW1 502-1), a second switch 502-2 (SW2 502-2), and a third switch 502-3 (SW3 502-3). Each switch 502 may include two switch terminals: a first switch terminal and a second switch terminal. The buck converter 402-1 includes these three switches and at least one switching node 504. The buck converter 402-1 may also include the energy storage unit 312, which is depicted as an inductor 312.

Each of the three switches is coupled to the switching node 504. The first switch 502-1 is coupled between the first voltage rail 302-1 and the switching node 504. The second switch 502-2 is coupled between the second voltage rail 302-2 and the switching node 504. The third switch 502-3 is coupled between the ground 318 (or the ground node 318) and the switching node 504. The energy storage unit 312 is coupled between the switching node 504 and the output node 314. Example operations of the buck converter 402-1 are described below, starting with FIGS. 6-1 to 6-4.

Each switch 502 may be realized using at least one transistor. The transistor may be implemented using at least one field-effect transistor (FET), at least one junction FET (JFET), at least one bipolar junction transistor (BJT), combinations thereof, and so forth. Manufacturers may fabricate FETs as n-channel or p-channel transistor types and may fabricate BJTs as NPN or PNP transistors. In some cases, a switch 502, such as the first switch 502-1, may be built using two transistors to prevent the switch from being inadvertently reverse biased. The first switch 502-1 may, for instance, be fabricated as two n-channel metal-oxide-semiconductor (NMOS) FETs that are coupled back-to-back (e.g., with the two NMOSFETs coupled together in series with respective source terminals coupled to a common node). Generally, any switch 502 (e.g., of FIG. 5-1 or 5-2) can be implemented as a single transistor or as a combination of multiple transistors. For example, two or more series transistors can be used to implement a single switch; this arrangement can reduce the voltage stress and increase breakdown voltages.

FIG. 5-2 is a circuit diagram 500-2 illustrating an example buck-boost converter 402-2 for a voltage regulator that is coupled to a load 206. The buck converter 402-1 of FIG. 5-1 can be extended as the buck-boost converter 402-2 of FIG.

5-2 by adding two switches. Thus, in example buck-boost implementations, the multiple switches 310 (e.g., of FIG. 3) can include at least five switches 502: the first switch 502-1 (SW1 502-1), the second switch 502-2 (SW2 502-2), the third switch 502-3 (SW3 502-3), a fourth switch 502-4 (SW4 502-4), and a fifth switch 502-5 (SW5 502-5). The buck-boost converter 402-2 includes these five switches 502-1 to 502-5 and at least two switching nodes 504: a first switching node 504-1 and a second switching node 504-2. The buck-boost converter 402-2 may also include the energy storage unit 312, which is depicted as an inductor 312.

Each of the five switches can be coupled to at least one switching node 504. As shown, the first switch 502-1 is coupled between the first voltage rail 302-1 and the first switching node 504-1. The second switch 502-2 is coupled between the second voltage rail 302-2 and the first switching node 504-1. The third switch 502-3 is coupled between the ground 318 (or the ground node 318) and the first switching node 504-1. Generally, the fourth switch 502-4 is coupled between the output capacitor 322 and the energy storage unit 312. The fifth switch 502-5 includes a first switch terminal that is coupled between the fourth switch 502-4 and the energy storage unit 312. The fifth switch 502-5 also includes a second switch terminal that is coupled to the ground 318.

In other words, the fourth switch 502-4 can be coupled between the second switching node 504-2 and the output node 314. The fifth switch 502-5 can be coupled between the second switching node 504-2 and the ground 318. The energy storage unit 312 can be coupled between the first switching node 504-1 and the second switching node 504-2. Example operations of the buck-boost converter 402-2 are described next, starting with FIGS. 6-1 to 6-4.

FIGS. 6-1 to 6-4 illustrate multiple modes (e.g., bucking and boosting modes) in conjunction with charging and discharging operations thereof. Described operations also include at least one pass-through operation. For efficiency, the bucking modes are described with respect to a buck-boost converter in which the fourth switch 502-4 (e.g., of FIG. 5-2) is in a closed state and the fifth switch 502-5 (e.g., also of FIG. 5-2) that is coupled to ground is in an open state. The bucking modes can, however, also be implemented with a buck converter that lacks the fourth and fifth switches 502-4 and 502-5 (e.g., using the buck converter 402-1 of FIG. 5-1).

For clarity, switch reference numerals are omitted from FIGS. 6-1 to 6-4. The switch reference numerals identified below, however, correspond to those illustrated in FIGS. 5-1 and 5-2. In each of FIGS. 6-1 to 6-4, a switch that is in an open state is depicted as being open with a solid line. Similarly, a switch that is in a closed state is depicted as being closed with a solid line. Switches that are changing states, on the other hand, are depicted with short-dashed lines and respective two-way arrows. The labels "D" and "1-D" indicate that corresponding switches are in inverted states during a given mode (e.g., if one switch is open, the other is closed). Generally, a thick solid line represents a current flow for a charging operation, and a thick short-dashed line represents a current flow for a discharging operation. The thick long-dashed line of FIG. 6-2 represents a current flow of a pass-through operation.

For clarity, the buck and boost modes are described below in an example battery depletion context or scenario. As the modes are described from FIG. 6-1 to FIG. 6-4, the battery 202 (with one or more battery cells) is becoming increasingly depleted and thus providing a decreasing voltage level. The various buck and boost modes may be engaged to compensate for the decreasing voltage level of the battery 202 that is being depleted. Nonetheless, the techniques and modes described herein can be performed in alternative situations besides a battery depletion scenario.

FIGS. 6-1 to 6-3 illustrate examples for one or more buck modes with various charging and discharging operations. Each of the bucking modes can provide a continuous output current. Further, due at least partly to implementation of a bucking mode, there is no right-hand plane zero (RHPZ) in the control system, so the loop bandwidth can be relatively high. For example, in some cases the loop bandwidth can exceed 500 kHz.

With respect to FIG. 6-1, a first bucking mode 600-1 is depicted. These current flows can correspond to a battery that is well charged and may be providing a high voltage level. Specifically, a first supply voltage 304-1 (of FIG. 3) of the first voltage rail 302-1 is greater than a targeted output voltage 316 (also of FIG. 3) for an output node 314. In this situation, the converter bucks from the first voltage rail 302-1—e.g., between the first supply voltage 304-1 and ground. To do so, a charging current flows from the first voltage rail 302-1, through a closed first switch 502-1, and through the inductor to the output, as represented by an arrow 602. The current is discharged through a closed third switch 502-3 via ground, as represented by an arrow 604. These current flows correspond to a first bucking operation from the first supply voltage 304-1.

With respect to FIG. 6-2, a second bucking mode 600-2 is depicted. These current flows can correspond to a battery that has lost some ability to maintain a high voltage level. Specifically, the first supply voltage 304-1 of the first voltage rail 302-1 is approximately equal to the targeted output voltage 316, and a second supply voltage 304-2 (e.g., of FIG. 3) of the second voltage rail 302-2 continues to be substantially greater than the targeted output voltage 316. In this situation, the buck-boost converter operates as a three-level buck with a charging operation, a pass-through operation, and a discharging operation. To do so, a charging current flows from the second voltage rail 302-2, through a closed second switch 502-2, and through the inductor to the output, as represented by an arrow 612. For the pass-through operation, a charging current flows from the first voltage rail 302-1, through a closed first switch 502-1, and through the inductor to the output, as represented by an arrow 614. The current is discharged through a closed third switch 502-3 via ground, as represented by an arrow 616.

With respect to FIG. 6-3, a third bucking mode 600-3 is depicted. These current flows can correspond to a battery that is depleted such that the relatively lower voltage rail is below the targeted output voltage 316, but the relatively higher voltage rail still exceeds this targeted output voltage. Specifically, the first supply voltage 304-1 of the first voltage rail 302-1 is less than the targeted output voltage 316, but the second supply voltage 304-2 of the second voltage rail 302-2 is greater than the targeted output voltage 316. In this situation, the converter bucks between the second voltage rail 302-2 and the first voltage rail 302-1—e.g., between the second supply voltage 304-2 and the first supply voltage 304-1, respectively. This reduces the voltage swing at the first switching node 504-1 (of FIG. 5-2) as compared to bucking between the second voltage rail 302-2 and ground. The reduced voltage swing can lower a ripple on the output voltage 316. To buck between these two voltage rails, a charging current flows from the second voltage rail 302-2, through a closed second switch 502-2, and through the inductor to the output, as represented by an arrow 622. The current is discharged through a closed first switch 502-1 via the first voltage rail 302-1, as represented by an arrow 624.

These current flows correspond to a second bucking operation that provides a reduced voltage swing.

FIG. 6-4 illustrates an example of at least one boost mode 600-4 with charging and discharging operations. These current flows can correspond to a battery that is fairly depleted such that the higher and lower voltage rails are below the targeted voltage for the output voltage 316. In some designs, this occurs after a battery falls below a 5% charge level (e.g., with 1-2% of charge remaining) and is therefore reserved for "seriously-low" or "emergency" battery conditions. Because of the low supply voltages, the boosting mode 600-4 is engaged. With the boosting mode 600-4, the output current is discontinuous, so the RHPZ becomes an issue, but the duty cycle is relatively small.

To implement the boosting mode 600-4, a charging current flows from the second voltage rail 302-2, through a closed second switch 502-2, through the inductor, and to the ground via a closed fifth switch 502-5, as represented by an arrow 632. The current is discharged through the closed second switch 502-2, through the inductor, and then to the output via a closed fourth switch 502-4, as represented by an arrow 634. This discharging provides a boosted output voltage that is based on the second supply voltage 304-2 of the second voltage rail 302-2 combined with the stored energy of the inductor.

FIGS. 7-1 to 7-4 illustrate multiple ramping signals and multiple switching control signals for example boosting and bucking control modes. Each figure includes a graph that depicts two or more ramp or ramping signals and multiple control signals that change or establish a state of a switch. The control circuitry 308 (e.g., of FIG. 3) can generate the switch control signals based on the ramp signals and at least one signal corresponding to an energy storage unit 312 or an output of the voltage regulator 128. The at least one signal can be realized using a current flowing through the energy storage unit 312, using the output voltage 316 (e.g., of FIG. 3) at the output node 314, some combination thereof, and so forth. The control circuitry 308 can generate the two or more ramp signals. An example of the control circuitry 308 is described below with reference to FIG. 8.

FIG. 7-1 illustrates in an example graph 700-1 multiple ramping signals and multiple switching control signals for an example bucking control mode. As shown, the graph 700-1 depicts signals with voltage versus time. In example implementations, the ramp signals include a second supply voltage (SV2) ramp and a ground (GND) ramp. The former may correspond to the second supply voltage 304-2 of the second voltage rail 302-2 (e.g., both of FIG. 3), and the latter may correspond to the ground voltage 320 of the ground node 318. As shown, the two ramping signals are opposing ramping signals in which one increases or rises while the other decreases or falls. The ramping signals may, however, be realized in different manners.

The example graph 700-1 separates the SV2 ramp and the GND ramp to establish a pass-through mode for the first supply voltage 304-1 (SV1) of the first voltage rail 302-1. The SV1 pass-through mode is appropriate when the energy storage unit (e.g., the inductor) can remain connected to the SV1 input and the output for an extend period of time (e.g., perhaps multiple switching cycles). This can occur when SV1 is close to the target output voltage, such as if the inductor current is neither increasing nor decreasing quickly (e.g., |(SV1−Vout/L)| is a small quantity). The SV1 pass-through mode may, however, be omitted. If present, the voltage gap between the opposing ramps may be established on a per-design basis. Regarding relevant factors for this design parameter, the voltage gap can be made wider to optimize efficiency and reduce switching events; however, this efficiency may be obtained at the cost of increased voltage ripple at the final voltage output. By way of example, the SV1 pass-through mode may extend between 0 and 200 millivolts (mmV) along the vertical axis. The graph 700-1 also depicts an error signal 702. The control circuitry 308 determines the error signal 702 based at least partly on one or more signals corresponding to the energy storage unit 312 or the output of the voltage regulator 128. Example approaches to determining the error signal 702 are described below with reference to FIG. 8.

The graph 700-1 includes switching control signals for three switches: the first switch 502-1 (SW1), which is coupled to the first supply voltage 304-1 (SV1); the third switch 502-3 (SW3), which is coupled to ground 318/320 (GND); and the second switch 502-2 (SW2), which is coupled to the second supply voltage 304-2 (SV2). The control circuitry 308 may change a value of a switching signal, and thus an open or closed state of a corresponding switch, responsive to intersections between the error signal 702 and a ramping signal. For simplicity, this is described in a cycle-by-cycle manner across multiple cycles 704-11 to 704-13.

In a first cycle 704-11 of the graph 700-1, the second switch SW2 is open. Initially, the first switch SW1 is closed, and the third switch SW3 is open. Responsive to the error signal 702 crossing "under" (e.g., becoming less than) the GND ramp signal, the control circuitry 308 opens the first switch SW1 and closes the third switch SW3. This can correspond to the voltage regulator 128 operating in a bucking mode in which the bucking is performed between the first supply voltage SV1 and ground GND.

In a second cycle 704-12 of the graph 700-1, the second switch SW2 continues to be open. The first switch SW1 is closed, and the third switch SW3 is open. These three switches do not change states during the second cycle 704-12. This can correspond to the voltage regulator 128 operating in a pass-through mode in which the energy storage unit 312 is charged via the first supply voltage SV1.

In a third cycle 704-13 of the graph 700-1, the third switch SW3 is open. Initially, the first switch SW1 is closed, and the second switch SW2 is open. Responsive to the error signal 702 climbing "above" (e.g., becoming greater than) the SV2 ramp signal, the control circuitry 308 opens the first switch SW1 and closes the second switch SW2. This third cycle 704-13 can correspond to the voltage regulator 128 operating in a bucking mode, in which the bucking is performed between the first supply voltage SV1 and the second supply voltage SV2.

FIG. 7-2 illustrates in an example graph 700-2 multiple ramping signals and multiple switching control signals for an example boosting control mode. As shown, the graph 700-2 depicts signals with voltage versus time. In example implementations, the ramp signals include a first supply voltage (SV1) ramp and a boost ramp. The former may correspond to the first supply voltage 304-1 of the first voltage rail 302-1 (e.g., both of FIG. 3), and the latter may correspond to a higher voltage for increasing the output voltage 316 to a level above that of a supply voltage. As shown, the two ramping signals are opposing ramping signals in which one increases or rises while the other decreases or falls. The ramping signals may, however, be realized in different manners.

The example graph 700-2 separates the SV1 ramp and the boost ramp to establish a pass-through mode for the second supply voltage 304-2 (SV2) of the second voltage rail 302-2. The SV2 pass-through mode may be omitted. The SV2 pass-through mode is appropriate when the energy storage unit (e.g., the inductor) can remain connected to the SV2 input and the output for an extend period of time (e.g., perhaps multiple switching cycles). This can occur when SV2 is close to the target output voltage, such as if the inductor current is neither increasing nor decreasing quickly (e.g., |(SV2−Vout/L)| is a small quantity). If present, the voltage gap between the opposing ramps may be established on a per-design basis. Regarding relevant factors for this design parameter, the voltage gap can be made wider to optimize efficiency and reduce switching events; however, this efficiency may be obtained at the cost of increased voltage ripple at the final voltage output. By way of example, the SV2 pass-through mode may extend between 0 and 200 millivolts (mmV) in the vertical direction. The graph 700-2 also depicts the error signal 702.

The graph 700-2 includes switching control signals for five switches: the second switch 502-2 (SW2); the first switch 502-1 (SW1); the third switch 502-3 (SW3); the fourth switch 502-4 (SW4), which is coupled between the energy storage unit 312 at the second switching node 504-2 and the output node 314; and the fifth switch 502-5 (SW5), which is coupled between the second switching node 504-2 and the ground 318. The control circuitry 308 may change a value of a switching signal, and thus an open or closed state of a corresponding switch, responsive to intersections between the error signal 702 and a ramping signal. For simplicity, this is described on a cycle-by-cycle basis.

Across the three illustrated cycles 704-21 to 704-23 of FIG. 7-2, the third switch SW3 to ground is open. Across the first two cycles 704-21 and 704-22, the fourth switch SW4 is closed, and the fifth switch SW5 is open. In a first cycle 704-21 of the graph 700-2, during a first portion of the cycle, the first switch SW1 is open, and the second switch SW2 is closed. Responsive to the error signal 702 crossing "under" (e.g., becoming greater than) the SV1 ramp signal, the control circuitry 308 opens the second switch SW2 and closes the first switch SW1.

In a second cycle 704-22 of the graph 700-2, the second switch SW2 is closed, and the first switch SW1 is open. The five switches do not change states during the second cycle 704-22. This can correspond to the voltage regulator 128 operating in a pass-through mode in which the energy storage unit 312 is charged via the second supply voltage SV2.

In a third cycle 704-23 of the graph 700-2, the error signal 702 continues to increase as the supply voltages may be decreasing. During the third cycle 704-23, the second switch SW2 continues to be closed, and the first switch SW1 continues to be open. Initially, the fourth switch SW4 is closed, and the fifth switch SW5 is open. In these states, charge can flow from the second supply voltage SV2 to the output node 314. Responsive to the error signal 702 climbing "above" (e.g., becoming greater than) the boost ramp signal, the control circuitry 308 opens the fourth switch SW4 and closes the fifth switch SW5. This third cycle 704-23 can correspond to the voltage regulator 128 operating in a boosting mode in which the energy storage unit 312 is being pre-charged by the second supply voltage SV2 during the latter portion of the cycle. This enables a boosted voltage to be delivered to the output node 314 responsive to the fourth and fifth switches flipping states in another cycle (e.g., a next cycle).

FIG. 7-3 illustrates in an example graph 700-3 multiple ramping signals (e.g., at least three ramp signals) and multiple switching control signals for an example combination of bucking and boosting control modes. The control circuitry 308 can make a smooth transition between bucking and boosting control modes that reduces voltage fluctuation at the output node 314. To do so, in example implementations, the SV1 ramp is at least partially overlaid on the SV2 ramp. For example, the voltage levels of the two ramps can be substantially coextensive, as depicted in FIG. 7-3. The SV1 ramp and the SV2 ramp can be located between the SV1 and SV2 pass-through modes if either or both of these two pass-through modes are present. For clarity, the SV2 ramp is depicted with a short-dashed line, and the SV1 ramp is depicted with a long-dashed and dotted line.

With this overlapping of the SV1 and SV2 ramp signals, the control circuitry 308 can start with (e.g., lead with) the first supply voltage SV1 or the second supply voltage SV2. The charging operation on a cyclical basis produces the same result. In other words, the duty cycles of the first switch SW1 and the second switch SW2 being in an open state versus a closed state are the same with either supply voltage leading (e.g., the duty cycles can be equivalent in terms of output voltage per cycle to the extent the two ramps are complementary). The switch control signals at 732 correspond to the first switch SW1 leading or to the first supply voltage SV1 being coupled to the energy storage unit 312 first. The switch control signals at 734 correspond to the second switch SW2 leading or to the second supply voltage SV2 being coupled to the energy storage unit 312 first.

In a first cycle 704-31 of the graph 700-3, at 732, the first switch SW1 is closed two-thirds of the period and then open for one-third of the period. The second switch SW2 is open for two-thirds of the period and then closed for the last one-third of the period. At 734, the second switch SW2 is closed for one-third of the period and then open for the remaining two-thirds. The first switch SW1 is open for one-third of the period and then closed for the final two-thirds of the period. Thus, although the order of the first and second switches SW1 and SW2 having open and closed states is swapped, the duty cycle of each is the same for the switch control signals 732 and 734. Accordingly, by overlapping the SV1 and SV2 ramps, the transition can be facilitated because the duty cycles are the same.

In the second cycle 704-32 of the graph 700-3, the first switch SW1 and the second switch SW2 have 50% duty cycles for the switching control signals at 732 and for the switching control signals at 734. In the third cycle 704-33 of the graph 700-3, the first switch SW1 and the second switch SW2 have two-thirds and one-third (⅓ and ⅔) duty cycles for the control signals at 732 and for the control signals at 734. The order is swapped between the control signals at 732 and 734 in the third cycle 704-33 and reversed relative to the orders of the control signals in the first cycle 704-31.

In the fourth cycle 704-34, the duty cycles are split 25% and 75%. Generally, with error-signal voltages falling between the two pass-through modes, if the controller is leading with the first supply voltage SV1, the controller can switch to the second supply voltage SV2 responsive to the error signal 702 being greater than the SV2 ramp signal. On the other hand, if the controller is leading with the second supply voltage SV2, the controller can switch to the first supply voltage SV1 responsive to the error signal 702 being less than the SV1 ramp signal.

FIG. 7-4 illustrates, in an example graph 700-4, multiple ramping signals that can facilitate a seamless transition between leading with different voltage rails while bucking between two voltage rails. As shown, the graph 700-4 depicts signals with voltage versus time along two axes. To facilitate a seamless transition between different voltage leads in a bucking mode, the ramp signals can at least partially overlap a common voltage range. In the illustrated example, the SV1 ramp substantially overlaps the SV2 ramp. This enables the duty cycles shown in FIG. 7-3 to have reciprocal or complementary periods, which enables either voltage rail to lead a control cycle while providing a same output voltage.

In example implementations, the controller can start regulating (e.g., charging if VS1>Vout or discharging if VS1<Vout) by initially using the first supply voltage SV1 approximately below the midpoint level 742 (horizontal thick dashed line). This corresponds to leading a control or switching cycle (e.g., a ramping period of one clock cycle) with the first voltage rail 302-1 initially coupled to the energy storage unit 312. The controller can start regulating (e.g., charging if VS2>Vout or discharging if VS2<Vout) by initially using the second supply voltage SV2 approximately above the midpoint level 742. This corresponds to leading a control or switching cycle (e.g., a ramping period) with the second voltage rail 302-2 initially coupled to the energy storage unit 312.

To at least reduce the potential for thrashing, the switching between supply voltage leads may be performed using a hysteresis scheme with two or more thresholds. To do so, the switching can be implemented based on, for example, a lower hysteresis threshold 744-1 (horizontal thick dashed line) that is below the midpoint level 742 and a higher hysteresis threshold 744-2 (horizontal thick dashed line) that is above the midpoint level 742. In an example approach, the lower hysteresis threshold 744-1 can be 25% above the voltage level at which the SV1 ramp starts each control cycle, and the higher hysteresis threshold 744-2 can be 75% above the voltage level at which the SV1 ramp starts each control cycle.

FIG. 8-1 is a schematic diagram 800-1 illustrating additional example aspects for a controller of a voltage regulator 128 (e.g., of FIGS. 2 and 3). A finite state machine 812 (FSM 812), a current loop 806, and multiple switch control signals 820 are depicted in FIG. 8-1 but described further below with reference to FIG. 8. As shown in FIG. 8-1, the current loop 806 generates the error signal 702. The FSM 812 includes lead determination circuitry 824. The lead determination circuitry 824 determines which voltage rail is to be initially coupled to an energy storage unit for a next control cycle. The lead determination circuitry 824 can determine the lead voltage rail based on the error signal 702, the lower hysteresis threshold 744-1, and the higher hysteresis threshold 744-2. Although not shown, the lead determination circuitry 824 can include one or more comparators to compare the error signal 702 to at least one hysteresis threshold 744, such as to both the upper and lower ones.

With reference jointly to FIGS. 7-4 and 8-1, the lead determination circuitry 824 operates at the end, or near the end, of each control cycle using the value of the error signal 702 at that time. Thus, the lead determination circuitry 824 can sample the error signal 702 at such a time. For instance, at time 746, the error signal 702 has "climbed" above the higher hysteresis threshold 744-2. Accordingly, by detecting this condition with a sampler and at least one comparator, the lead determination circuitry 824 determines that the second voltage rail 302-2 will lead the next control cycle. In these manners, the voltage converter can smoothly shift between control modes (e.g., switching between pairs of modulating ramp signals) by seamlessly transitioning between voltage rail leads.

FIG. 8 is a circuit diagram 800 illustrating example circuitry for a controller of a voltage regulator 128 (e.g., of FIGS. 2 and 3). In example implementations, the control circuitry 308 (e.g., of FIG. 3) can include, for example, a current determiner 802, two or more ramp generators 808 (e.g., at least three ramp generators), one or more comparators 810, and at least one finite state machine 812 (FSM 812). The current determiner 802 can include a voltage loop 804 and a current loop 806, which can be realized as an average current loop 806 for operating on an average current. The multiple ramp generators 808-1 . . . 808-R and the one or more comparators 810-1 . . . 810-R can include "R" instances of each. Here, the variable "R" may represent an integer greater than one, such as two, four, or eight. To implement the four-ramp modulation examples of FIGS. 7-3 and 7-4, "R" can correspond to four. In operation, the control circuitry 308 may use a current sensor 814, as is described next.

Generally, the control circuitry 308 can control open/closed states of the multiple switches 310 of the voltage regulator 128 based on (i) at least one signal corresponding to the energy storage unit 312 or to the output of the voltage regulator 128 and (ii) two or more ramp signals, examples of which are described above with reference to FIGS. 7-1 to 7-4. The at least one signal can include one derived from a current or one derived from a voltage, including both of such signals. The current sensor 814 senses a current 816 relating to the energy storage unit 312, such as a current flowing through an inductor thereof. The current sensor 814 provides an indication of the current 816, such as a mirrored current 822, to the current loop 806. The mirrored current 822 may be scaled. The current sensor can, for example, use one of the multiple switches 502-1 to 502-5 while the switch is connected in series with the inductor, use another transistor (not shown) that is coupled to the inductor, and so forth. In some cases, each switch 502 is built using at least one transistor, such as at least one power FET. The power FET can form part of a current sensing circuit. The switch 502-4, for instance, may be able to sense the current 816 alone. Alternatively, the switches 502-1 and/or 502-2 may jointly sense the current 816 separately or together by combining values from different times.

FIG. 8-2 is a schematic diagram illustrating an example current determiner 802 of the controller of FIG. 8. As shown in FIG. 8-2, the voltage loop 804 includes a voltage compensator 826 that accepts the reference voltage (V.ref) and the output voltage 316. The current loop 806 includes a current sensor 828 and a current compensator 830. The current sensor 828 accepts the mirrored current 822 and converts the signal thereof to the voltage domain as a current indication 832. The current sensor 828 provides the current indication 832 in the voltage domain to the current compensator 830.

Each compensator (e.g., the voltage compensator 826 or the current compensator 830) can include, for example, an operational amplifier with one or more capacitors and/or resistors or a Gm/transconductance amplifier with one or more capacitors and/or resistors. The voltage compensator 826 can stabilize the voltage loop 804, and the current compensator 830 can stabilize the current loop 806. The voltage compensator 826 produces a difference voltage 818 based on the output voltage 316 and the reference voltage (V.ref). The voltage compensator 826 provides the difference voltage 818 to the current compensator 830. The current compensator 830 produces another difference voltage, which can be used to provide the error signal 702, based on the difference voltage 818 as output by the voltage compensator 826 and on the current indication 832, which can be produced by a current summer of the current sensor 828.

Generally, the voltage compensator 826 can maintain steady voltage regulation in the converter. The current compensator 830 supports the stability of the current loop 806. The bandwidth of the current loop 806 is sufficiently wide to avoid presenting another pole to the voltage loop 804. In some cases, the current compensator 830 can filter out noise allowing the error signal 702 to adjust smoothly and avoid large changes in the duty cycle.

In example operations, the current compensator 830 accepts the transformed current indication 832 and the difference voltage 818. The current compensator 830 produces the error signal 702 based on the instantaneous current indication 832, which is realized in the voltage domain, and the difference voltage 818. In some cases, circuitry and/or functionality of the current sensor 828 (e.g., including a current summer) may be combined with circuitry and/or functionality of the current compensator 830. The current compensator 830 can provide the error signal 702 to one or more modulators. Each respective modulator can include a respective ramp generator 808 and a respective comparator 810 (both of FIG. 8). The output of the voltage compensator 826 represents the average current for regulating the load, and the current loop 806 ensures that the power stage is delivering an average current that is sufficient to meet the average current used to regulate the load.

Continuing with reference to both FIG. 8 and FIG. 8-2, the current loop 806 can convert the sensed current 822 relating to the inductor 312 to a voltage-based signal that represents the current 816 flowing through the inductor. For instance, the current sensor 828 can drop the sensed current (s) 822 through a resistor (of the current sensor 828) and sum the currents to convert them into a voltage. The voltage-based signal 832 for the sensed current 822 may be compared to another voltage, such as the voltage 818 that is output by the voltage compensator 826. Thus, this other voltage can be provided to the current loop 806 by the voltage loop 804. More specifically, the current compensator 830 may compare a voltage value of the signal 832 to another voltage value of the difference voltage 818. To produce the difference voltage 818, the voltage loop 804 obtains the output voltage 316 from the output node 314. The voltage loop 804 also obtains a reference voltage (V.ref) that corresponds to a targeted voltage level for the output voltage 316. The voltage loop 804 can compare the output voltage 316 to the reference voltage (V.ref) to, for instance, determine the difference voltage 818. The voltage loop 804 provides the difference voltage 818 to the current compensator 830 of the current loop 806.

The current compensator 830 can therefore obtain (e.g., accept, receive, or sense) the difference voltage 818 from the voltage loop 804 and the voltage-based signal 832, which represents the sensed current 822, from the current sensor 828. In operation, the current compensator 830 can filter the voltage-based signal 832, which corresponds to a summation of the sensed current(s) 822 from the current sensor 828. The current compensator 830 of the current loop 806 can compare the difference voltage 818 to the voltage-based signal 832 to determine a signal indicative of the current (e.g., an average current-mode sense current) corresponding to the energy storage unit 312. Generally, the current loop 806 can produce the error signal 702 based on the difference voltage 818 and the current 816 by using the voltage-based signal 832 because the voltage-based signal 832 is responsive to, or derived from, the current 816 via the sensed current 822, which may be a scaled version of the current 816. The current compensator 830 can determine the error signal 702 through, for instance, a comparison and/or amplification operation that determines a difference between the voltage-based signal 832 and the difference voltage 818. Although the modulators establish the duty cycles (as described below), the current loop 806 ensures that the sensed current of the inductor follows the target current, which is determined by the voltage loop 804.

In example operations of the current loop 806, the output of the current sensor 828 is a continuous time signal that increases or decreases responsive to the inductor current. The voltage-based current indication 832 can thus be considered to represent a scaled version of the instantaneous value of the inductor current. In some cases, the currents used by the current loop 806 can be approximately, e.g., 10,000 times smaller than the current flowing through the inductor. This continuous time signal is than compared to the voltage signal (the difference voltage 818) that is output by the voltage loop 804 and filtered in a manner such that the average value of the current indication 832 is substantially equivalent to the average value of 818 over multiple switching cycles. The error signal 702 can then be used by the modulators to increase or decrease the power stage duty cycle to increase or decrease the average value of the inductor current. Thus, the current compensator 830 can perform the averaging of the current over time.

The current loop 806 can provide the error signal 702 to each comparator 810 of the multiple comparators 810-1 . . . 810-R. Each comparator 810 also receives a ramp signal 834 of multiple ramp signals 834-1 . . . 834-R from a respective ramp generator 808 of the multiple ramp generators 808-1 . . . 808-R. Each ramp generator 808 can generate a ramp signal 834, such as those described above with reference to FIGS. 7-1 to 7-4. Thus, ramp signals may include a boost ramp, a second supply voltage SV2 ramp, a first supply voltage SV1 ramp, a ground ramp, and so forth. Ramp signals may be generated using, for example, a stack of components including a current source and a capacitor that are coupled together in series between a voltage rail and a ground node. A switch can be coupled in parallel with the capacitor to start, stop, or reset the ramping of charge on a plate of the capacitor. The ramping may start from ground or another lower voltage level and climb to a supply voltage or another higher voltage level. Alternatively, the ramping may start from a supply voltage or another higher voltage level and descend to ground or another lower voltage level. Pairs of ramp signals in which one ramp climbs while the other ramp falls are referred to herein as opposing ramp signals. In some cases, a quantity of ramp generators may be doubled so that each set of ramp generators can be used on alternating cycles, which provides time for the other set to reinitialize to a starting voltage level while not "in use."

Using "modulator" terminology, each modulator (not separately indicated) may be formed from a comparator 810 and a ramp generator 808 in conjunction with the error signal 702. The modulators can provide pulse-width modulation (PWM) capable of generating a wide range of duty cycles. In operation, each respective comparator 810 compares a respective ramp signal to the error signal 702 and provides a comparator output 836 (or modulator output 836) of multiple comparator outputs 836-1 . . . 836-R (or multiple modulator outputs 836-1 . . . 836-R). A respective comparator output 836 can indicate, for instance, which signal is greater or less than the other between the error signal 702 and a respective ramp signal 834. The comparators 810-1 . . . 810-R may operate synchronously or asynchronously, with the latter providing an output signal change, or indicator signal, responsive to two input signals crossing without "waiting" for a clock signal to trigger a change to the output signal. Thus, the multiple comparators 810-1 . . . 810-R provide multiple comparator output signals 836-1 . . . 836-R that can indicate whether the error signal 702 is "above" or "below" (e.g., greater than or less than) the corresponding ramp signal 834. The multiple comparators 810-1 . . . 810-R provide the multiple comparator output signals 836-1 . . . 836-R to the finite state machine 812 (FSM 812).

The FSM 812 can implement the control analysis techniques described above with reference to FIGS. 6-1 to 6-4 and 7-1 to 7-4. Thus, the FSM 812 can produce multiple switch control signals 820 to control the open or closed states of the multiple switches 310. As explicitly shown in FIG. 8, these switch control signals 820 can open or close the first, second, and third switches 502-1, 502-2, and 502-3 for one or more bucking modes. The switch control signals 820 can also or instead open or close the fourth and fifth switches 502-4 and 502-5 for at least one boosting mode. Although specific circuitry is illustrated in FIGS. 8, 8-1, and 8-2 and described above for the control circuitry 308, this circuitry is presented by way of example only. The control circuitry 308 may be implemented using different circuitry to realize the modes, charging operations, and signals of FIGS. 6-1 to 6-4 and 7-1 to 7-4.

Figure 9:
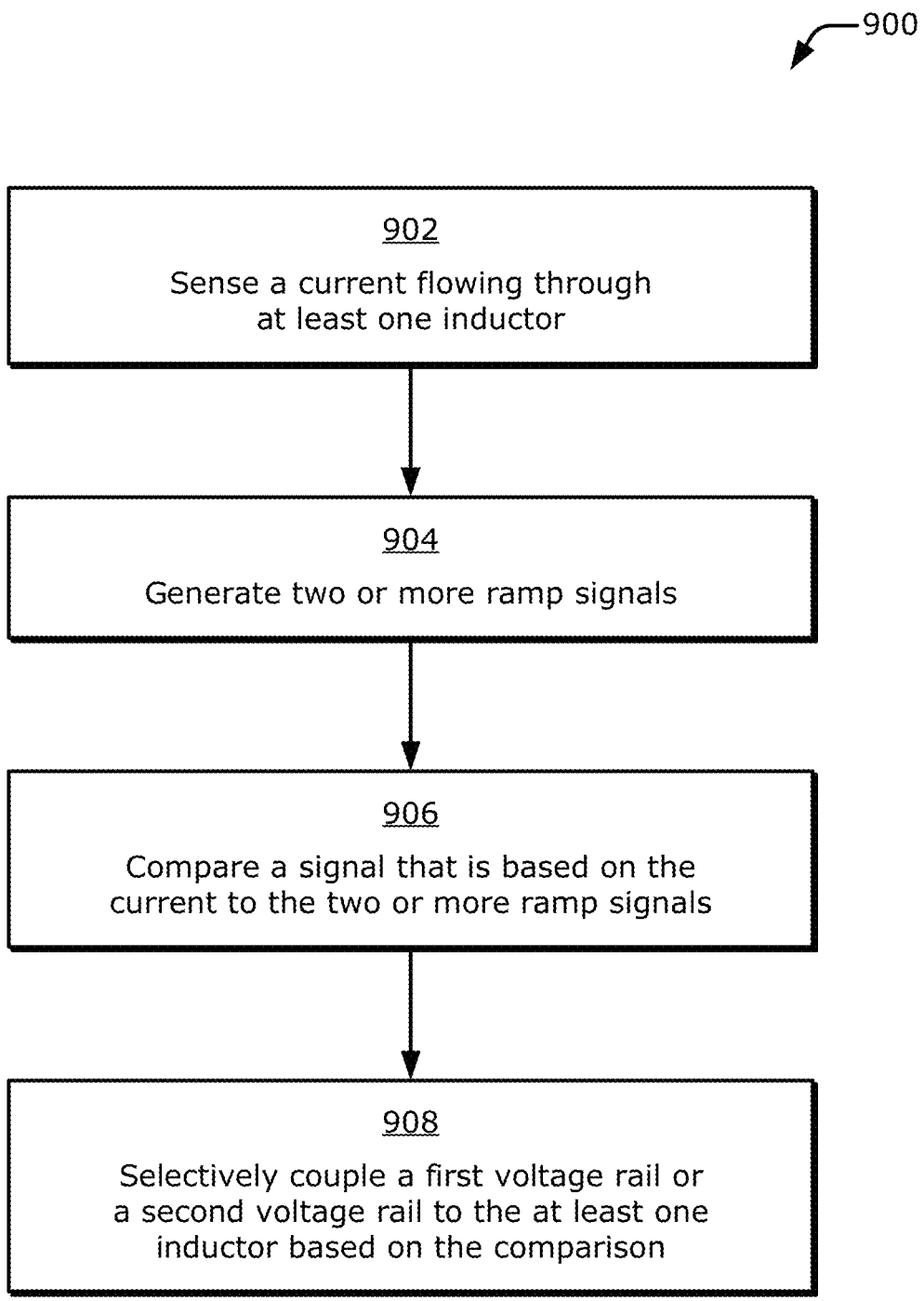
FIG. 9 is a flow diagram illustrating an example process for voltage regulation, which process can include operating a voltage regulator.

FIG. 9 is a flow diagram illustrating an example process 900 for voltage regulation, which can include operating a voltage regulator. The process 900 is described in the form of a set of blocks 902-908 that specify operations that can be performed. However, operations are not necessarily limited to the order shown in FIG. 9 or described herein, for the operations may be implemented in alternative orders or in fully or partially overlapping manners. Also, more, fewer, and/or different operations may be implemented to perform the process 900 or an alternative process. Operations represented by the illustrated blocks of the process 900 may be performed by a power system 120 or a portion thereof, such as by a battery subsystem 124 or a voltage regulator 128.

At block 902, a voltage regulator is sensing a current flowing through at least one inductor. For example, control circuitry 308 can sense a current 816 flowing through at least one inductor 312. This sensing may be performed by a current sensor 814, which can output a mirrored current 822 for control processing.

At block 904, the voltage regulator is generating two or more ramp signals. For example, the control circuitry 308 can generate two or more ramp signals, such as a boost ramp signal, a second supply voltage SV2 ramp signal, a first supply voltage SV1 ramp signal, a ground ramp signal, and so forth. In some cases, a respective ramp generator 808 may produce a respective ramp signal and provide the ramp signal to at least one comparator 810.

At block 906, the voltage regulator is comparing a signal that is based on the current to the two or more ramp signals. For example, the control circuitry 308 can compare an error signal 702 that is based on the current 816 to the two or more ramp signals (e.g., the boost, SV2, SV1, or GND ramp signals). To do so, a respective comparator 810 may compare a respective ramp signal to the error signal 702 and produce a comparator output signal indicative of which input signal is greater or less than the other.

At block 908, the voltage regulator is selectively coupling a first voltage rail or a second voltage rail to the at least one inductor based on the comparing. For example, the control circuitry 308 can selectively couple a first voltage rail 302-1 and a second voltage rail 302-2 to the at least one inductor 312 based on the comparing. For instance, a finite state machine 812 may process the comparator outputs and produce one or more switch control signals 820 based on the comparator output signals. The FSM 812 may apply the one or more switch control signals 820 to one or more switches 502 of the multiple switches 502-1 to 502-5 to change or establish open/closed states of each of the switches to control the voltage regulator 128 across one or more bucking modes and at least one boosting mode. In some cases, the selectively coupling can include bucking between two voltage levels or passing a supply voltage to the at least one inductor 312.

This section describes some aspects of example implementations and/or example configurations related to the apparatuses and/or processes presented above.

Example aspect 1: An apparatus for voltage regulation, the apparatus comprising:
  a battery subsystem comprising a first terminal, a second terminal, a third terminal, and at least one battery; and
  a voltage regulator coupled to the first terminal, the second terminal, and the third terminal, the voltage regulator comprising:
    multiple switches comprising a first switch coupled to the first terminal, a second switch coupled to the second terminal, and a third switch coupled to the third terminal;
    an energy storage unit coupled to the multiple switches; and
    control circuitry coupled to the multiple switches and configured to selectively couple the energy storage unit to:
      the first terminal via the first switch;
      the second terminal via the second switch; or
      the third terminal via the third switch.

Example aspect 2: The apparatus of example aspect 1, wherein the battery subsystem is configured to:
  provide a first voltage level at the first terminal; and
  provide a second voltage level at the second terminal.

Example aspect 3: The apparatus of example aspect 2, wherein the second voltage level is approximately twice the first voltage level.

Example aspect 4: The apparatus of any one of the preceding example aspects, wherein:
  the at least one battery comprises a first battery cell and a second battery cell coupled together in series between the second terminal and the third terminal; and
  the battery subsystem comprises a center tap coupled to the at least one battery between the first battery cell and the second battery cell, the center tap coupled to the first terminal.

Example aspect 5: The apparatus of any one of the preceding example aspects, wherein the battery subsystem comprises:
  voltage adjustment circuitry coupled to the at least one battery, the voltage adjustment circuitry coupled between the first terminal and the second terminal.

Example aspect 6: The apparatus of example aspect 5, wherein:
  the at least one battery and the voltage adjustment circuitry are coupled together in series between the second terminal and the third terminal; and
  the at least one battery is coupled between the first terminal and the third terminal.

Example aspect 7: The apparatus of example aspect 5 or 6, wherein:
  the voltage adjustment circuitry comprises a charge pump; and the voltage regulator comprises a dual-input, three-level buck converter or a dual-input, three-level buck-boost converter.

Example aspect 8: The apparatus of any one of example aspects 5-7, wherein:
the at least one battery comprises a first battery cell and a second battery cell; and
the at least one battery is coupled between the second terminal and the third terminal.

Example aspect 9: The apparatus of example aspect 5 or 8, wherein:
the voltage adjustment circuitry comprises a capacitive divider; and
the voltage regulator comprises a dual-input, three-level buck converter or a dual-input, three-level buck-boost converter.

Example aspect 10: The apparatus of any one of the preceding example aspects, wherein the control circuitry comprises:
multiple ramp generators; and
one or more comparators coupled between the multiple ramp generators and the multiple switches.

Example aspect 11: The apparatus of example aspect 10, wherein the control circuitry comprises:
circuitry configured to determine a current corresponding to the voltage regulator, the circuitry coupled between the energy storage unit and the multiple ramp generators; and
a finite state machine coupled between the one or more comparators and the multiple switches.

Example aspect 12: The apparatus of example aspect 11, wherein:
the multiple ramp generators comprise at least three ramp generators; and
the finite state machine is configured to operate the multiple switches based on at least three ramp signals provided by the at least three ramp generators and based on the current provided by the circuitry.

Example aspect 13: The apparatus of any one of the preceding example aspects, further comprising:
a first voltage rail coupled between the first terminal of the battery subsystem and the first switch of the voltage regulator;
a second voltage rail coupled between the second terminal of the battery subsystem and the second switch of the voltage regulator; and
a ground node coupled between the third terminal of the battery subsystem and the third switch of the voltage regulator.

Example aspect 14: The apparatus of example aspect 13, wherein:
the energy storage unit comprises an inductor;
the inductor is coupled between a switching node and an output of the voltage regulator;
the voltage regulator comprises a capacitor coupled between the output of the voltage regulator and the ground node;
the first switch is coupled between the first voltage rail and the switching node;
the second switch is coupled between the second voltage rail and the switching node; and
the third switch is coupled between the ground node and the switching node.

Example aspect 15: The apparatus of example aspect 1, 13, or 14, wherein the control circuitry is configured to:
open the second switch and open and close the first switch and the third switch to implement a first bucking operation;
open the third switch and open and close the first switch and the second switch to implement a second bucking operation; and
open the second switch and the third switch and close the first switch to implement a pass-through mode.

Example aspect 16: The apparatus of any one of example aspects 1 or 13-15, wherein the control circuitry is configured to:
operate the first switch and the second switch to buck between a first supply voltage corresponding to the first voltage rail and a second supply voltage corresponding to the second voltage rail.

Example aspect 17: The apparatus of any one of example aspects 1 or 13-16, wherein the control circuitry is configured to:
operate the multiple switches based on a signal corresponding to the energy storage unit and multiple ramp signals.

Example aspect 18: The apparatus of example aspect 17, wherein the signal comprises an average current-mode sense current that flows through an inductor of the energy storage unit.

Example aspect 19: The apparatus of any one of the preceding example aspects, wherein:
the voltage regulator comprises a capacitor; and
the multiple switches comprise a fourth switch and a fifth switch, the fourth switch coupled between the capacitor and the energy storage unit, the fifth switch comprising:
a first switch terminal coupled between the fourth switch and the energy storage unit; and
a second switch terminal coupled to ground.

Example aspect 20: The apparatus of any one of the preceding example aspects, wherein the control circuitry is configured to:
operate the multiple switches to selectively operate the voltage regulator in one or more buck modes and operate the voltage regulator in at least one boost mode.

Example aspect 21: The apparatus of any one of the preceding example aspects, further comprising:
a display screen coupled to the voltage regulator; and
a processor operatively coupled to the display screen and configured to present one or more graphical images on the display screen,
wherein the voltage regulator is configured to provide power to at least the display screen using the battery subsystem.

Example aspect 22: An apparatus for voltage regulation, the apparatus comprising:
power means for providing a first supply voltage and a second supply voltage;
energy means for storing energy from the power means;
switching means for selectively coupling the power means to the energy means; and
control means for operating the switching means to selectively couple the first supply voltage and the second supply voltage to the energy means based on a current corresponding to the energy means.

Example aspect 23: The apparatus of example aspect 22, wherein the power means comprises:
adjustment means for adjusting a voltage level of at least one battery to produce the first supply voltage or the second supply voltage from the at least one battery.

Example aspect 24: The apparatus of example aspect 22 or 23, wherein:
the control means comprises ramping means to generate three or more ramp signals; and
the control means is configured to operate the switching means based on the three or more ramp signals.

Example aspect 25: The apparatus of any one of example aspects 22-24, wherein:
the control means comprises sense means for sensing the current corresponding to the energy means;
the control means comprises voltage loop means for obtaining an output voltage; and
the control means is configured to operate the switching means based on the output voltage.

Example aspect 26: The apparatus of any one of example aspects 22-25, wherein the control means comprises:
bucking means for causing the switching means to selectively couple the first supply voltage and the second supply voltage to the energy means to generate an output voltage responsive to at least one of the first supply voltage or the second supply voltage being higher than a reference voltage; and
boosting means for causing the switching means to selectively couple the first supply voltage or the second supply voltage to the energy means to generate the output voltage responsive to the first supply voltage and the second supply voltage being lower than the reference voltage.

Example aspect 27: A method for voltage regulation, the method comprising:
sensing a current flowing through at least one inductor;
generating two or more ramp signals;
comparing a signal that is based on the current to the two or more ramp signals; and
selectively coupling a first voltage rail or a second voltage rail to the at least one inductor based on the comparing.

Example aspect 28: The method of example aspect 27, further comprising:
generating a first supply voltage on the first voltage rail or a second supply voltage on the second voltage rail using at least one battery and voltage adjustment circuitry.

Example aspect 29: The method of example aspect 27 or 28, wherein the selectively coupling comprises:
bucking between a first supply voltage of the first voltage rail and a ground;
passing the first supply voltage of the first voltage rail to the at least one inductor; and
bucking between a second supply voltage of the second voltage rail and the first supply voltage of the first voltage rail.

Example aspect 30: An apparatus for voltage regulation, the apparatus comprising:
a battery subsystem configured to hold a first voltage rail to a first supply voltage and a second voltage rail to a second supply voltage; and
a voltage regulator comprising:
a first switch coupled to the first voltage rail and a second switch coupled to the second voltage rail;
an energy storage unit coupled between:
an output of the voltage regulator; and
the first switch and the second switch; and
control circuitry coupled to the energy storage unit and configured to operate the voltage regulator in multiple modes based on a signal corresponding to the energy storage unit, the multiple modes comprising:
a first bucking mode that bucks between the first supply voltage and a ground using the first switch;
a second bucking mode that bucks between the second supply voltage and the first supply voltage using the second switch and the first switch; and
a boosting mode that couples the second supply voltage to the energy storage unit using the second switch.

As used herein, "couple," "coupled," or "coupling" refers to a relationship between two or more components that are in operative communication magnetically, electromagnetically, or by being electrically connected to implement some feature or realize some capability that is described. The term "connect," "connected," or "connecting" refers to an electrical connection using a physical line, such as a metal trace or wire. In some cases, an electrical connection can include a resistor, a capacitor, an inductor, a transistor, and so forth. A connection can include a direct connection or an indirect connection. A direct connection refers to connecting discrete circuit elements via a same node without an intervening element. An indirect connection refers to connecting discrete circuit elements via one or more other devices or other discrete circuit elements. The terms "direct" and "indirect" may also modify or otherwise be applied to "coupling."

The terms "first," "second," "third," and other numeric-related indicators or differentiators are used herein to identify or distinguish similar or analogous items from one another within a given context. Such contexts can include a particular implementation, a given component, a single drawing figure or a group of related drawing figures, or a claim. Thus, a first item in one context may be the same as or may differ from a first item in another context. For example, an item identified as a "first switch" or a "first voltage" in one context may be identified for clarity purposes as a "second switch" or a "second voltage," respectively, in another context.

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). As used herein, a phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c, or any other ordering of a, b, and c). Further, items represented in the accompanying figures and terms discussed herein may be indicative of one or more items or terms, and thus reference may be made interchangeably to single or plural forms of the items and terms in this written description. Finally, although subject matter has been described in language specific to structural features or methodological operations, it is to be understood that the subject matter defined in the appended claims is not necessarily limited to the specific features or operations described above, including not necessarily being limited to the organizations in which features are arranged or the orders in which operations are performed.

What is claimed is:

1. An apparatus for voltage regulation, the apparatus comprising:
a battery subsystem comprising a first terminal, a second terminal, a third terminal, a first battery cell coupled in series with a second battery cell, the first battery cell coupled to the second terminal and the second battery cell coupled to the third terminal; and a voltage regulator coupled to the first terminal, the second terminal, and the third terminal, the voltage regulator comprising:

multiple switches comprising a first switch coupled to the first terminal, a second switch coupled to the second terminal, and a third switch coupled to the third terminal;

an energy storage unit coupled to the multiple switches; and control circuitry comprising multiple comparators, each comparator having a first input coupled to at least one of three ramp generators and a second input that receives an indication of current related to the energy storage unit, the multiple comparators each having outputs coupled to a finite state machine, the finite state machine further coupled to the multiple switches and configured, based on the output of the comparators, to selectively couple the energy storage unit to:

the first terminal via the first switch;
the second terminal via the second switch; or
the third terminal via the third switch.

2. The apparatus of claim 1, wherein the battery subsystem is configured to:
provide a first voltage level at the first terminal; and
provide a second voltage level at the second terminal.

3. The apparatus of claim 2, wherein the second voltage level is approximately twice the first voltage level.

4. The apparatus of claim 1, further comprising:
a center tap coupled between the first battery cell and the second battery cell, the center tap coupled to the first terminal.

5. The apparatus of claim 1, wherein the battery subsystem comprises:
voltage adjustment circuitry coupled to at least one of the first battery cell or the second battery cell, the voltage adjustment circuitry coupled between the first terminal and the second terminal.

6. The apparatus of claim 5, wherein:
at least one of the first battery cell or the second battery cell and the voltage adjustment circuitry are coupled together in series between the second terminal and the third terminal.

7. The apparatus of claim 6, wherein:
the voltage adjustment circuitry comprises a charge pump; and
the voltage regulator comprises a dual-input, three-level buck converter or a dual-input, three-level buck-boost converter.

8. The apparatus of claim 5, wherein:
the voltage adjustment circuitry comprises a capacitive divider; and
the voltage regulator comprises a dual-input, three-level buck converter or a dual-input, three-level buck-boost converter.

9. The apparatus of claim 1, further comprising:
a first voltage rail coupled between the first terminal of the battery subsystem and the first switch of the voltage regulator;

a second voltage rail coupled between the second terminal of the battery subsystem and the second switch of the voltage regulator; and a ground node coupled between the third terminal of the battery subsystem and the third switch of the voltage regulator.

10. The apparatus of claim 9, wherein:
the energy storage unit comprises an inductor;
the inductor is coupled between a switching node and an output of the voltage regulator;
the voltage regulator comprises a capacitor coupled between the output of the voltage regulator and the ground node;
the first switch is coupled between the first voltage rail and the switching node;
the second switch is coupled between the second voltage rail and the switching node; and
the third switch is coupled between the ground node and the switching node.

11. The apparatus of claim 9, wherein the control circuitry is configured to:
open the second switch and open and close the first switch and the third switch to implement a first bucking operation;
open the third switch and open and close the first switch and the second switch to implement a second bucking operation; and
open the second switch and the third switch and close the first switch to implement a pass-through mode.

12. The apparatus of claim 9, wherein the control circuitry is configured to:
operate the first switch and the second switch to buck between a first supply voltage corresponding to the first voltage rail and a second supply voltage corresponding to the second voltage rail.

13. The apparatus of claim 1, wherein the indication of the current from the energy storage unit comprises an average current-mode sense current that flows through an inductor of the energy storage unit.

14. The apparatus of claim 1, wherein:
the voltage regulator comprises a capacitor; and
the multiple switches comprise a fourth switch and a fifth switch, the fourth switch coupled between the capacitor and the energy storage unit, the fifth switch comprising:
a first switch terminal coupled between the fourth switch and the energy storage unit; and
a second switch terminal coupled to ground.

15. The apparatus of claim 14, wherein the control circuitry is configured to:
operate the multiple switches to selectively operate the voltage regulator in one or more buck modes and operate the voltage regulator in at least one boost mode.

16. The apparatus of claim 1, further comprising:
a display screen coupled to the voltage regulator; and
a processor operatively coupled to the display screen and configured to present one or more graphical images on the display screen,
wherein the voltage regulator is configured to provide power to at least the display screen using the battery subsystem.

* * * * *